US011809613B2

(12) United States Patent
Zahnert et al.

(10) Patent No.: US 11,809,613 B2
(45) Date of Patent: Nov. 7, 2023

(54) EVENT-BASED CAMERA WITH HIGH-RESOLUTION FRAME OUTPUT

(71) Applicant: Magic Leap, Inc., Plantation, FL (US)

(72) Inventors: Martin Georg Zahnert, Zurich (CH); Alexander Ilic, Zurich (CH)

(73) Assignee: Magic Leap, Inc., Plantation, FL (US)

( * ) Notice: Subject to any disclaimer, the term of this patent is extended or adjusted under 35 U.S.C. 154(b) by 412 days.

(21) Appl. No.: 17/293,018

(22) PCT Filed: Oct. 30, 2019

(86) PCT No.: PCT/US2019/058838
§ 371 (c)(1),
(2) Date: May 11, 2021

(87) PCT Pub. No.: WO2020/101895
PCT Pub. Date: May 22, 2020

(65) Prior Publication Data
US 2021/0409629 A1 Dec. 30, 2021

Related U.S. Application Data

(60) Provisional application No. 62/759,995, filed on Nov. 12, 2018.

(51) Int. Cl.
*G06F 3/01* (2006.01)
*G06T 7/593* (2017.01)
(Continued)

(52) U.S. Cl.
CPC ............ *G06F 3/011* (2013.01); *G06T 7/593* (2017.01); *G06V 10/20* (2022.01); *H04N 25/531* (2023.01);
(Continued)

(58) Field of Classification Search
None
See application file for complete search history.

(56) References Cited

U.S. PATENT DOCUMENTS 6,271,785 B1 8/2001 Martin et al.
9,529,192 B2 12/2016 Border
(Continued)

FOREIGN PATENT DOCUMENTS

| WO | WO 2007/069892 A1 | 6/2007 |
| WO | WO 2012/022927 A1 | 2/2012 |
| WO | WO 2016/181391 A1 | 11/2016 |

OTHER PUBLICATIONS

International Search Report and Written Opinion for Application No. PCT/US2019/058807 dated Feb. 21, 2020.
(Continued)

*Primary Examiner* — Mark T Monk
(74) *Attorney, Agent, or Firm* — Wolf, Greenfield & Sacks, P.C.

(57) ABSTRACT

A high-resolution image sensor suitable for use in an augmented reality (AR) system to provide low latency image analysis with low power consumption. The AR system can be compact, and may be small enough to be packaged within a wearable device such as a set of goggles or mounted on a frame resembling ordinary eyeglasses. The image sensor may receive information about a region of an imaging array associated with a movable object, selectively output imaging information for that region, and synchronously output high-resolution image frames. The region may be updated dynamically as the image sensor and/or the object moves. The image sensor may output the high-resolution image frames less frequently than the region being updated when the image sensor and/or the object moves. Such an image sensor provides a small amount of data from which object (Continued)

information used in rendering an AR scene can be developed.

20 Claims, 20 Drawing Sheets

(51) Int. Cl.
| | |
|---|---|
| *H04N 25/531* | (2023.01) |
| *H04N 25/75* | (2023.01) |
| *H04N 25/705* | (2023.01) |
| *G06V 10/20* | (2022.01) |
| *H04N 13/106* | (2018.01) |
| *G06T 19/00* | (2011.01) |
| *H04N 13/00* | (2018.01) |

(52) U.S. Cl.
CPC .......... *H04N 25/705* (2023.01); *H04N 25/75* (2023.01); *G06T 19/006* (2013.01); *G06T 2207/10012* (2013.01); *H04N 13/106* (2018.05); *H04N 2013/0081* (2013.01)

(56) References Cited

U.S. PATENT DOCUMENTS

| | | | |
|---|---|---|---|
| 9,826,176 | B1 | 11/2017 | Vogelsang |
| 9,990,761 | B1 | 6/2018 | Anderson et al. |
| 10,152,775 | B1 | 12/2018 | Bellows et al. |
| 11,269,402 | B1 | 3/2022 | Canberk et al. |
| 2001/0025914 | A1 | 10/2001 | Pyyhtia et al. |
| 2002/0005485 | A1 | 1/2002 | Hashimoto et al. |
| 2003/0174146 | A1 | 9/2003 | Kenoyer |
| 2009/0109313 | A1 | 4/2009 | Liu et al. |
| 2012/0091372 | A1 | 4/2012 | Molnar et al. |
| 2012/0236124 | A1 | 9/2012 | Aoki |
| 2013/0063400 | A1 | 3/2013 | Ahn et al. |
| 2013/0076953 | A1 | 3/2013 | Sekine et al. |
| 2013/0126703 | A1 | 5/2013 | Caulfield |
| 2014/0192238 | A1* | 7/2014 | Attar ...................... H04N 5/262 348/252 |
| 2014/0326854 | A1 | 11/2014 | Delbruck et al. |
| 2015/0062003 | A1 | 3/2015 | Rafii et al. |
| 2015/0228114 | A1 | 8/2015 | Shapira et al. |
| 2015/0243105 | A1 | 8/2015 | Abovitz et al. |
| 2015/0260474 | A1 | 9/2015 | Rublowsky et al. |
| 2015/0302658 | A1 | 10/2015 | O'Connor et al. |
| 2015/0365617 | A1 | 12/2015 | Chen |
| 2016/0026253 | A1 | 1/2016 | Bradski et al. |
| 2016/0148433 | A1 | 5/2016 | Petrovskaya et al. |
| 2016/0187969 | A1 | 6/2016 | Larsen et al. |
| 2016/0191887 | A1 | 6/2016 | Casas |
| 2016/0262608 | A1 | 9/2016 | Krueger |
| 2016/0309134 | A1 | 10/2016 | Venkataraman et al. |
| 2016/0320834 | A1* | 11/2016 | Lee ......................... G06F 3/017 |
| 2016/0335487 | A1 | 11/2016 | Ming et al. |
| 2016/0360970 | A1 | 12/2016 | Tzvieli et al. |
| 2017/0094243 | A1 | 3/2017 | Venkataraman et al. |
| 2017/0168586 | A1 | 6/2017 | Sinha et al. |
| 2017/0176575 | A1 | 6/2017 | Smits |
| 2017/0227841 | A1 | 8/2017 | Niemela et al. |
| 2017/0285343 | A1 | 10/2017 | Belenkii et al. |
| 2017/0302859 | A1 | 10/2017 | Nakanishi et al. |
| 2017/0345218 | A1 | 11/2017 | Bedikian et al. |
| 2017/0345398 | A1 | 11/2017 | Fuchs et al. |
| 2017/0374360 | A1 | 12/2017 | Kranski et al. |
| 2018/0115763 | A1 | 4/2018 | Hung et al. |
| 2018/0182173 | A1 | 6/2018 | Robaina et al. |
| 2018/0188538 | A1 | 7/2018 | Bell |
| 2018/0239144 | A1 | 8/2018 | Woods et al. |
| 2018/0249151 | A1 | 8/2018 | Freeman et al. |
| 2018/0268229 | A1* | 9/2018 | Nakata .................. B60W 40/02 |
| 2018/0278843 | A1 | 9/2018 | Smith et al. |
| 2018/0300897 | A1 | 10/2018 | Woods et al. |
| 2019/0056792 | A1 | 2/2019 | Wan et al. |
| 2019/0197765 | A1 | 6/2019 | Molyneaux et al. |
| 2019/0317597 | A1 | 10/2019 | Aleem et al. |
| 2019/0355169 | A1 | 11/2019 | Sapienza et al. |
| 2021/0165229 | A1 | 6/2021 | Stahl et al. |
| 2021/0409626 | A1 | 12/2021 | Zahnert et al. |
| 2021/0409632 | A1 | 12/2021 | Zahnert et al. |
| 2022/0014689 | A1 | 1/2022 | Zahnert et al. |
| 2022/0051441 | A1 | 2/2022 | Zahnert et al. |

OTHER PUBLICATIONS

Invitation to Pay Additional Fees for Application No. PCT/US2019/058807 dated Dec. 13, 2019.
International Preliminary Report on Patentability for Application No. PCT/US2019/058807 dated May 20, 2021.
International Search Report and Written Opinion for Application No. PCT/US2019/058810 dated Feb. 24, 2020.
Invitation to Pay Additional Fees for Application No. PCT/US2019/058810 dated Dec. 13, 2019.
International Preliminary Report on Patentability for Application No. PCT/US2019/058810 dated May 20, 2021.
International Search Report and Written Opinion for Application No. PCT/US2019/058838 dated Feb. 27, 2020.
Invitation to Pay Additional Fees for Application No. PCT/US2019/058838 dated Dec. 17, 2019.
International Preliminary Report on Patentability for Application No. PCT/US2019/058838 dated May 20, 2021.
International Search Report and Written Opinion for Application No. PCT/US2019/060791 dated Mar. 10, 2020.
Invitation to Pay Additional Fees for Application No. PCT/US2019/060791 dated Jan. 13, 2020.
International Preliminary Report on Patentability for Application No. PCT/US2019/060791 dated May 27, 2021.
Invitation to Pay Additional Fees for Application No. PCT/US2019/067476 dated Feb. 27, 2020.
International Search Report and Written Opinion for Application No. PCT/US2019/067476 dated Apr. 29, 2020.
International Preliminary Report on Patentability for Application No. PCT/US2019/067476 dated Jul. 1, 2021.
Invitation to Pay Additional Fees for Application No. PCT/US2020/017119 dated Apr. 23, 2020.
International Search Report and Written Opinion for Application No. PCT/US2020/017119 dated Jun. 23, 2020.
International Preliminary Report on Patentability for Application No. PCT/US2020/017119 dated Aug. 19, 2021.
International Search Report and Written Opinion for Application No. PCT/US2020/017121 dated May 7, 2020.
International Preliminary Report on Patentability for Application No. PCT/US2020/017121 dated Aug. 19, 2021.
Detone et al., Deep image homography estimation. arXiv preprint. arXiv:1606.03798. Jun. 13, 2016. 6 pages.
Zahnert et al., Multi-Camera Cross Reality Device, U.S. Appl. No. 17/415,699, filed Jun. 17, 2021.
Zahnert et al., Lightweight Cross Reality Device With Passive Depth Extraction, U.S. Appl. No. 17/428,948, filed Aug. 5, 2021.
Zahnert et al., Lightweight And Low Power Cross Reality Device With High Temporal Resolution, U.S. Appl. No. 17/428,958, filed Aug. 5, 2021.
U.S. Appl. No. 16/229,870, filed Dec. 21, 2018, Molyneaux et al.
U.S. Appl. No. 17/293,014, filed May 11, 2021, Zahnert et al.
U.S. Appl. No. 17/293,029, filed May 11, 2021, Zahnert et al.
U.S. Appl. No. 17/293,387, filed May 11, 2021, Zahnert et al.
U.S. Appl. No. 17/415,699, filed Jun. 17, 2021, Zahnert et al.
U.S. Appl. No. 17/428,948, filed Aug. 5, 2021, Zahnert et al.
U.S. Appl. No. 17/428,958, filed Aug. 5, 2021, Zahnert et al.
PCT/US2019/058807, Feb. 21, 2020, International Search Report and Written Opinion.
PCT/US2019/058807, Dec. 13, 2019, Invitation to Pay Additional Fees.
PCT/US2019/058807, May 20, 2021, International Preliminary Report on Patentability.
PCT/US2019/058810, Feb. 24, 2020, International Search Report and Written Opinion.

(56) References Cited

OTHER PUBLICATIONS

PCT/US2019/058810, Dec. 13, 2019, Invitation to Pay Additional Fees.
PCT/US2019/058810, May 20, 2021, International Preliminary Report on Patentability.
PCT/US2019/058838, Feb. 27, 2020, International Search Report and Written Opinion.
PCT/US2019/058838, Dec. 17, 2019, Invitation to Pay Additional Fees.
PCT/US2019/058838, May 20, 2021, International Preliminary Report on Patentability.
PCT/US2019/060791, Mar. 10, 2020, International Search Report and Written Opinion.
PCT/US2019/060791, Jan. 13, 2020, Invitation to Pay Additional Fees.
PCT/US2019/060791, May 27, 2021, International Preliminary Report on Patentability.
PCT/US2019/067476, Feb. 27, 2020, Invitation to Pay Additional Fees.
PCT/US2019/067476, Apr. 29, 2020, International Search Report and Written Opinion.
PCT/US2019/067476, Jul. 1, 2021, International Preliminary Report on Patentability.
PCT/US2020/017119, Apr. 23, 2020, Invitation to Pay Additional Fees.
PCT/US2020/017119, Jun. 23, 2020, International Search Report and Written Opinion.
PCT/US2020/017119, Aug. 19, 2021, International Preliminary Report on Patentability.
PCT/US2020/017121, May 7, 2020, International Search Report and Written Opinion.
PCT/US2020/017121, Aug. 19, 2021, International Preliminary Report on Patentability.

* cited by examiner

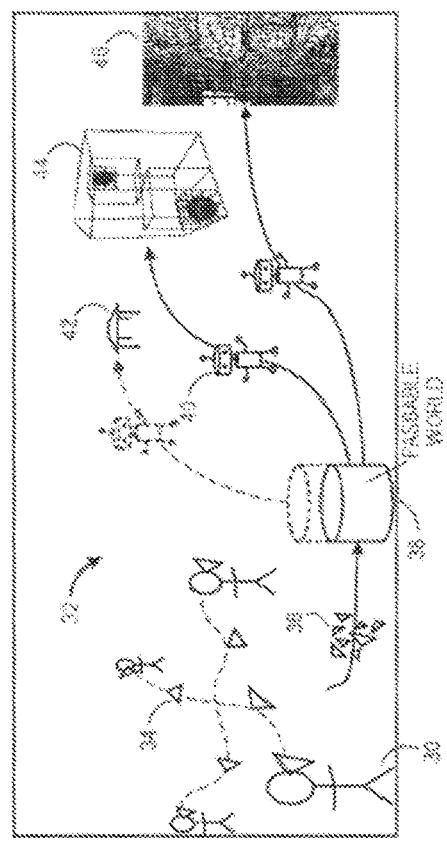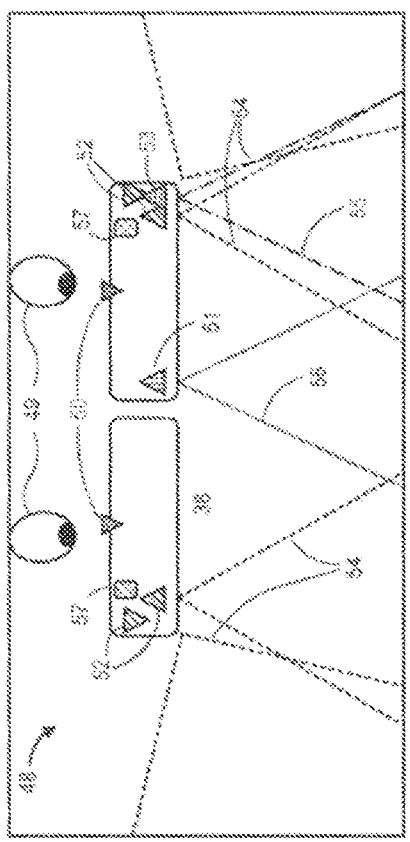
FIG. 3A
FIG. 3B

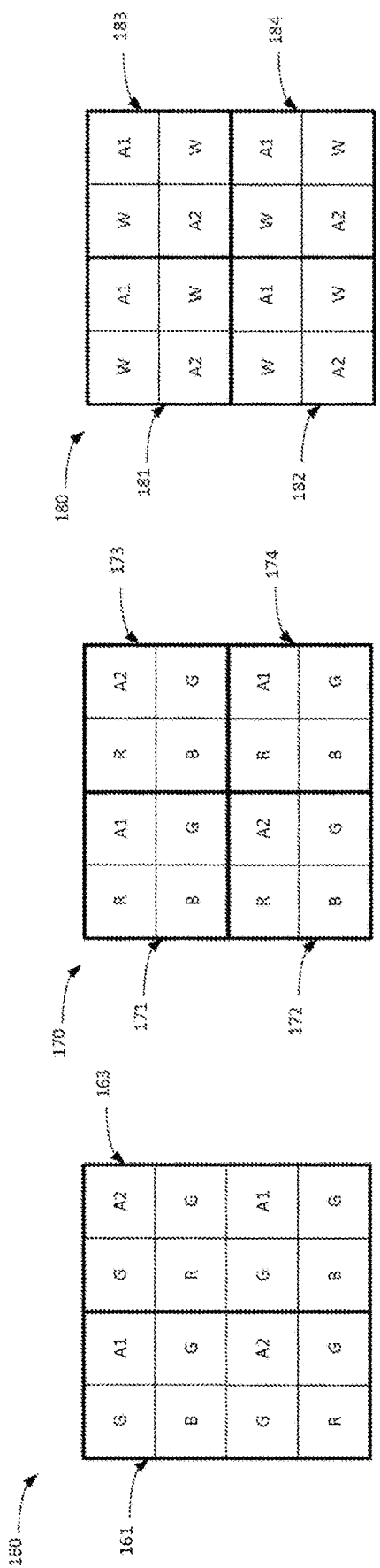

EVENT-BASED CAMERA WITH HIGH-RESOLUTION FRAME OUTPUT

RELATED APPLICATIONS

This Application is a national stage filing under 35 U.S.C. § 371 of International Patent Application Serial No. PCT/US2019/058838, filed Oct. 30, 2019, entitled "EVENT-BASED CAMERA WITH HIGH-RESOLUTION FRAME OUTPUT," which claims priority under 35 U.S.C. § 119(e) to U.S. Provisional Application Ser. No. 62/759,995, filed Nov. 12, 2018, entitled "EVENT-BASED CAMERA WITH HIGH-RESOLUTION FRAME OUTPUT." The entire contents of these applications are incorporated herein by reference in their entirety.

TECHNICAL FIELD

This application relates generally to methods and apparatus for low-latency motion and/or low-power processing of image information.

BACKGROUND

Computers may control human user interfaces to create an X Reality (XR or cross reality) environment in which some or all of the XR environment, as perceived by the user, is generated by the computer. These XR environments may be virtual reality (VR), augmented reality (AR), or mixed reality (MR) environments, in which some or all of an XR environment may be generated by computers using, in part, data that describes the environment. This data may describe, for example, virtual objects that may be rendered in a way that users sense or perceive as a part of a physical world such that users can interact with the virtual objects. The user may experience these virtual objects as a result of the data being rendered and presented through a user interface device, such as, for example, a head-mounted display device. The data may be displayed to the user to see, or may control audio that is played for the user to hear, or may control a tactile (or haptic) interface, enabling the user to experience touch sensations that the user senses or perceives as feeling the virtual object.

XR systems may be useful for many applications, spanning the fields of scientific visualization, medical training, engineering design and prototyping, tele-manipulation and tele-presence, and personal entertainment. AR and MR, in contrast to VR, include one or more virtual objects in relation to real objects of the physical world. The experience of virtual objects interacting with real objects greatly enhances the user's enjoyment in using the XR system, and also opens the door for a variety of applications that present realistic and readily understandable information about how the physical world might be altered.

BRIEF SUMMARY

Aspects of the present application relate to methods and apparatus for capturing image information in XR systems with low latency and/or low power consumption. Techniques as described herein may be used together, separately, or in any suitable combination.

Some embodiments relate to an image sensor comprising an image array, an input configured to receive signals specifying a selected region of the imaging array, at least one output at which signals representative of at least the selected region of the imaging array are presented, and a second output at which signals representative of changes in a detected image in the selected region of the imaging array are presented. The image sensor may comprise a plurality of pixel cells comprising the imaging array, at least one intensity readout circuit operatively coupled to the light-sensitive components of the plurality of pixel cells, at least one event detection circuit operatively coupled to the light-sensitive components of the plurality of pixel cells, and an enable circuit. Each pixel cell of the plurality of pixel cells may comprise a light-sensitive component. The at least one intensity readout circuit may be configured to provide signals indicating sensed light intensity at at least a portion of the light-sensitive components of the plurality of pixel cells at an output of the at least one output of the image sensor. The at least one event detection circuit may be configured to provide signals indicating a change in sensed light at at least a portion of the light-sensitive components of the plurality of pixel cells. The enable circuit may be operatively coupled to the input specifying the selected region of the imaging array and operatively coupled to the at least one event detection circuit, to control a selected portion of the pixel cells for which a signal indicating a change in sensed light is coupled to an output of the at least one output of the image sensor.

In some embodiments, the imaging array may have a resolution higher than 1 megapixel.

In some embodiments, the selected region of the imaging array may constitute no more than 20% of the imaging array.

In some embodiments, the at least one intensity readout circuit is configured to operate in a rolling shutter mode.

In some embodiments, the image sensor may be in combination with: a support member, wherein the image sensor is a first image sensor mounted to the frame; a second image sensor mounted to the support member; and at least one processor, wherein the processor is configured to process image information from the first image sensor when operating in the rolling shutter mode and the second image sensor to produce stereoscopic image information.

In some embodiments, the at least one intensity readout circuit may be configured to operate in a global shutter mode.

In some embodiments, the image sensor may be in combination with: at least one transmissive diffraction mask in a light path to the image sensor; and at least one processor, wherein the processor is configured to process image information from the image sensor when operating in the global shutter mode to extract passive depth information.

In some embodiments, the enable circuit may be operatively coupled to the at least one intensity readout circuit to control a selected portion of the pixel cells for which a signal indicating the sensed light intensity is provided to an output of the at least one output.

In some embodiments, the at least one intensity readout circuit may output the signals indicating the sensed light intensity at the at least a portion of the light-sensitive components of the plurality of pixel cells at fixed time intervals.

In some embodiments, the at least one intensity readout circuit may output the signals indicating the sensed light intensity at the at least a portion of the light-sensitive components of the plurality of pixel cells at in response to a control input to the image sensor.

In some embodiments, the at least one intensity readout circuit may output the signals indicating the sensed light intensity based on the signals indicating the change in sensed light from the at least one event readout circuit.

In some embodiments, a device for use in a cross reality system, comprising a support member; the image sensor of any of the above described embodiments mechanically coupled to the support member, wherein the image sensor is a first image sensor; a second image sensor mechanically coupled to the support member and spaced apart from the first image sensor, the second image sensor comprising a second plurality of pixel cells generating image information for respective regions in a field of view of the second sensor; a processor, operatively coupled to the first and second sensors and configured to generate depth information about an object based on the signals indicating the sensed light intensity based on correspondence between the signals indicating the change in sensed light from the at least one event readout circuit of the first image sensor and the image information from the second image sensor.

Some embodiments relate to a method of operating a cross reality system comprising a sensor worn by a user and a processor configured to process image information, the sensor comprising a plurality of pixel cells generating image frames and event information for respective regions in a field of view of the sensor. The method may comprise: identifying an object in the vicinity of the user; identifying a patch based at least in part on a portion of the identified object; providing at a first data rate, from the sensor to the processor, the image frames from the plurality of pixel cells for the respective regions in the field of view of the sensor; and selectively providing at a second data rate, from the sensor to the processor, the event information from a portion of the plurality of pixel cells based at least in part on correspondence between the patch and portion of the plurality of pixel cells, the second data rate being higher than the first data rate.

In some embodiments, the portion of the plurality of pixel cells of the sensor is a first portion of the plurality of pixel cells. The method may further comprise: periodically estimating, at a third data rate, a trajectory for the patch based at least in part on the identified object; and enabling a plurality of portions of the plurality of pixel cells of the sensor at different times based at least in part on the estimated trajectory of the patch, wherein the plurality of portions of the plurality of pixel cells comprise the first portion of the plurality of pixel cells.

In some embodiments, the sensor is a first sensor. The computing system may comprise a second senor comprising a second plurality of pixel cells generating image frames for respective regions in a field of view of the second sensor. The method may comprise: providing, from the second sensor to the processor, the image frames from the second plurality of pixel cells of the second sensor for the respective regions in the field of view of the second sensor; and computing depth information of an object within the field of views of both the first and second sensors based at least in part on correspondence between the image frames from the first sensor and the image frames from the second sensor.

Some embodiments relate to an image sensor comprising a plurality of pixel cells. At least one pixel cell may comprise a light-sensitive component; an intensity readout circuit operatively coupled to the light-sensitive component, the intensity readout circuit configured to sample an intensity of a light incident sensed by the light-sensitive component; an event readout circuit operatively coupled to the light-sensitive component, the event readout circuit configured to generate an output signal when the intensity of the light incident changes by at least a predetermined amount; and a depth readout circuit operatively coupled to the light-sensitive component, the depth readout circuit configured to indicate an angle of the light incident.

In some embodiments, the intensity readout circuit may be operatively coupled to the event readout circuit.

In some embodiments, the intensity readout circuit may sample the intensity of the light incident when the event readout circuit generates the output signal.

In some embodiments, the event readout circuit may be enabled or disabled based, at least in part, on an output of the intensity readout circuit.

The foregoing summary is provided by way of illustration and is not intended to be limiting.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

Figure (FIG. 1 is a sketch illustrating an example of a simplified augmented reality (AR) scene, according to some embodiments.

FIG. 3A is a schematic diagram illustrating a user wearing an AR display system rendering AR content as the user moves through a physical world environment, according to some embodiments.

FIG. 3B is a schematic diagram illustrating a viewing optics assembly and attendant components, according to some embodiments.

FIG. 18A is a pixel subarray with color pixel cells and angle of arrival pixel cells, according to some embodiments.

FIG. 18B is a pixel subarray with color pixel cells and angle of arrival pixel cells, according to some embodiments.

FIG. 18C is a pixel subarray with white pixel cells and angle of arrival pixel cells, according to some embodiments.

DETAILED DESCRIPTION

Figure 1:
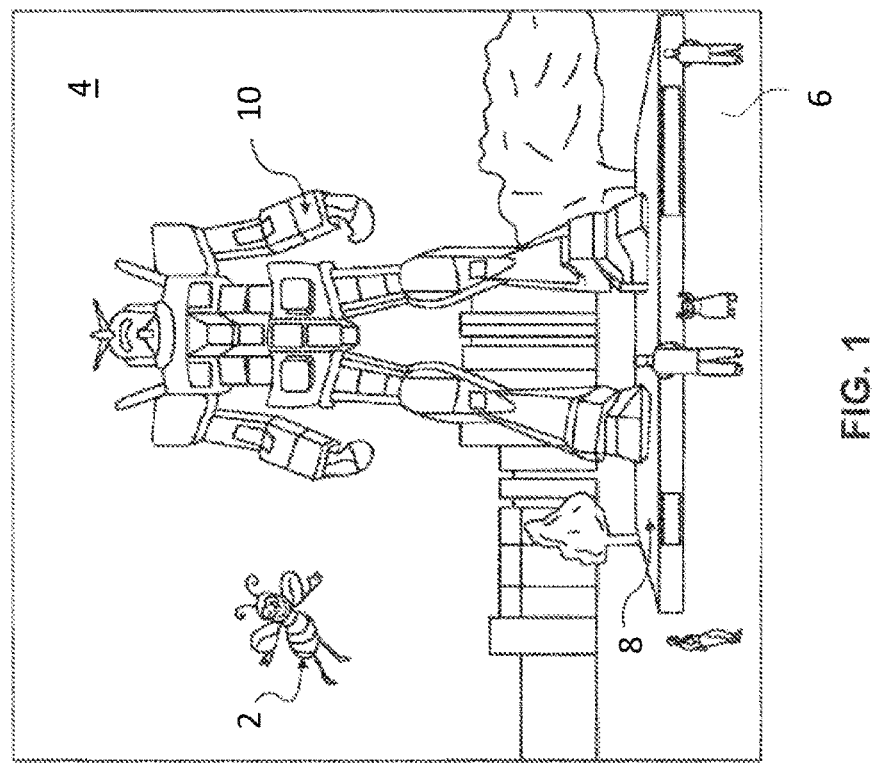

Described herein are techniques for operating augmented reality (AR) and mixed reality (MR) systems to acquire image information about physical objects in the physical world with low latency and/or low power consumption.

Information about physical objects is used to realistically present computer-generated virtual objects in the appropriate position and with the appropriate appearance relative to physical objects. The inventors have recognized and appreciated that the need for AR and MR systems to acquire information about objects in the physical world imposes limitations on the size, power consumption and realism of AR and MR systems. As a result of such limitations, the utility and user-enjoyment of those systems is limited.

Known AR and MR systems have sensors worn by a user that obtain information about objects in the physical world around the user, including information about the position of the physical world objects in the field of view of the user. Challenges arise because the objects may move relative to the field of view of the user, either as a result of the objects moving in the physical world or the user changing their pose relative to the physical world such that physical objects come into or leave the field of view of the user or the position of physical objects within the field of view of the user changes. To present realistic AR or MR displays, a model of the physical objects in the physical world must be updated frequently enough to capture these changes, processed with sufficiently low latency, and accurately predicted into the future to cover the full latency path including rendering such that virtual objects displayed based on that information will have the appropriate position and appearance relative to the physical objects as the virtual objects are displayed. Otherwise, virtual objects will appear out of alignment with physical objects, and the combined scene including physical and virtual objects will not appear realistic. For example, virtual objects might look as if they are floating in space, rather than resting on a physical object or may appear to bounce around relative to physical objects. Errors of the visual tracking are especially amplified when the user is moving at a high speed and if there is significant movement in the scene.

Such problems might be avoided by sensors that acquire new data at a high rate. However, the power consumed by such sensors can lead to a need for larger batteries or limit the length of use of such systems. Similarly, processors needed to process data generated at a high rate can drain batteries and add weight to a wearable system, all of which limit the utility or enjoyability of such systems. A known approach, for example, is to operate higher resolution to capture enough visual detail and higher framerate sensors for increased temporal resolution. Alternative solutions might complement the solution with a IR time-of-flight sensor, which might directly indicate position of physical objects relative to the sensor, simple processing, yielding low latency might be performed in using this information to display virtual objects. However, the such sensors consume substantial amounts of power, particularly if they operate in sunlight.

The inventors have recognized and appreciated that AR and MR systems may acquire information about physical objects with low latency and/or reduced power consumption and/or with small components through the use of image sensors that provide for processing image information in a specific region or regions of an image array. The specific regions of the image array may change over time and may be selected based on projected movement of one or more objects with respect to the user's field of view. By outputting information collected in "patches" of the image array, rather than all information that potentially could be captured by the image array, the amount of information provided for processing may be limited, reducing the processing requirements and latency with which position information about physical objects is available.

Such information may be captured with a passive array, such that power consumption and size may be low. In some embodiments, the sensor may be configured to output differential image information, providing information about pixel cells of the image array for which a change is detected. By outputting only differential image information within identified patches, the amount of information for processing may be relatively low, allowing that information to be processed for use in generating AR scenes with low latency in compact and low power processors.

The inventors have recognized and appreciated that AR and MR systems may acquire information about physical objects with low latency and/or reduced power consumption and/or with small components through the use of image sensors incorporating dynamic vision sensing (DVS) techniques in which image information is only provided for pixel cells for which changes are detected. Each change detected by a pixel cell may be output as an "event." By outputting information in events, which may be asynchronous rather than in a constant, periodic rate, motion of objects may be detected faster. In contrast, a conventional image sensor may output image frames. To achieve the same temporal and spatial resolution, a conventional frame-based imager would create significant bandwidth and computing needs containing potentially 8 to 12 megapixels of image information per frame, at a rate of 30 Hz or higher. The image information from conventional image sensors arrives slower and requires more processing to track motion of objects as part of rendering AR or MR scenes at least in part due to the relatively large image size and relatively large quantity of images, which leads to both high latency and high power consumption.

By combining DVS techniques with patch tracking, the inventors have overcome a limitation on conventional DVS systems that enables image sensors combining both to provide substantial advantages in XR systems. In conventional DVS systems, the image sensor, as well as objects being imaged, may be moving, which would lead to a very large number of pixels in the image array changing and therefore a large number of events per second. As a result, DVS techniques have been applied in limited circumstances or in image sensors that have a relatively small number of pixels, such as image sensors with a resolution below 1 megapixel, for example, 128×128, 240×180, and 346×260. The low resolution of conventional DVS sensors leads to limited sensitivity. Images processed in XR systems might, desirably, have high-resolution frames, with potentially millions of pixels. The angular resolution, which may indicate the number of pixels and/or the degree of field-of-view (FOV) of a camera, should be high enough to resolve the physical world to a level that minimizes quantization errors (e.g., vision-based jitter), which would disturb user experience. With such resolution, a sensor used in an XR system might generate about 2 million events per second, which poses high computing burden, consuming substantial power and introducing substantial latency. In some embodiments, the sensor may output differential image information at a frequency no less than 200 Hz, which may translate to a latency of less than 5 ms. In some embodiments, the sensor may output differential image information at a frequency similar to an output rate of an inertial measurement unit (IMU), for example, 1 kHz or higher.

In contrast, an image sensor with patch tracking and DVS techniques in an XR system may output events, for example, at an average rate of 1,000 to 2,000 per second. This amount of image information may be sufficient to track motion of objects and/or the user's own movements over a wide range of conditions so that an AR or MR scene may be quickly updated.

The inventors have recognized and appreciated that in order to effectively use DVS techniques in AR and MR systems, additional information from high resolution images is required from time to time. Such information may be used, for example, to detect objects to track so that a patch location and/or trajectory may be determined. Alternatively or additionally, some moving objects may not be amenable to tracking via DVS techniques. An object, such as a hand, that fills the entire field of view of a camera using an image sensor with DVS, may not trigger sufficient events as it moves because the image does not appear different even as the object moves. The inventors have further recognized and appreciated that the times at which events and full frame images need to be captured in an XR system are largely independent such that a small and low power wearable device for an XR system may be achieved with an image sensor that may be controlled to selectively output events or full image frames.

The inventors have recognized and appreciated that AR and MR systems may acquire information about physical objects with low latency and/or reduced power consumption and/or with small components through the use of image sensors that apply plenoptic camera techniques with dynamic vision sensor (DVS) techniques. To display a virtual object on a tabletop, the system must know how far away from the user the tabletop is. Known systems may use active depth sensors that emit light with particular qualities, e.g., a pattern that is then detected and analyzed to determine depth information, or a pulse that is used to make time of flight measurements. The inventors have recognized and appreciated that active depth sensors typically consume more power than is desirable in a wearable device, such as a head-mounted AR or MR display. Accordingly, some embodiments include an image sensor in which some or all of the pixel cells are configured to output image information from which depth information may be derived. Such pixel cells may support passive depth measurement. In some embodiments, those pixel cells may be configured to measure the angle of arrival of incident light without requiring an active source of light. Angle of arrival of the light forming the image is correlated with the distance of an object from the user. Thus, depth information may be computed from angle of arrival information obtained by the system. It should be noted that plenoptic cameras are sometimes referred to as light field cameras.

Figure 2:
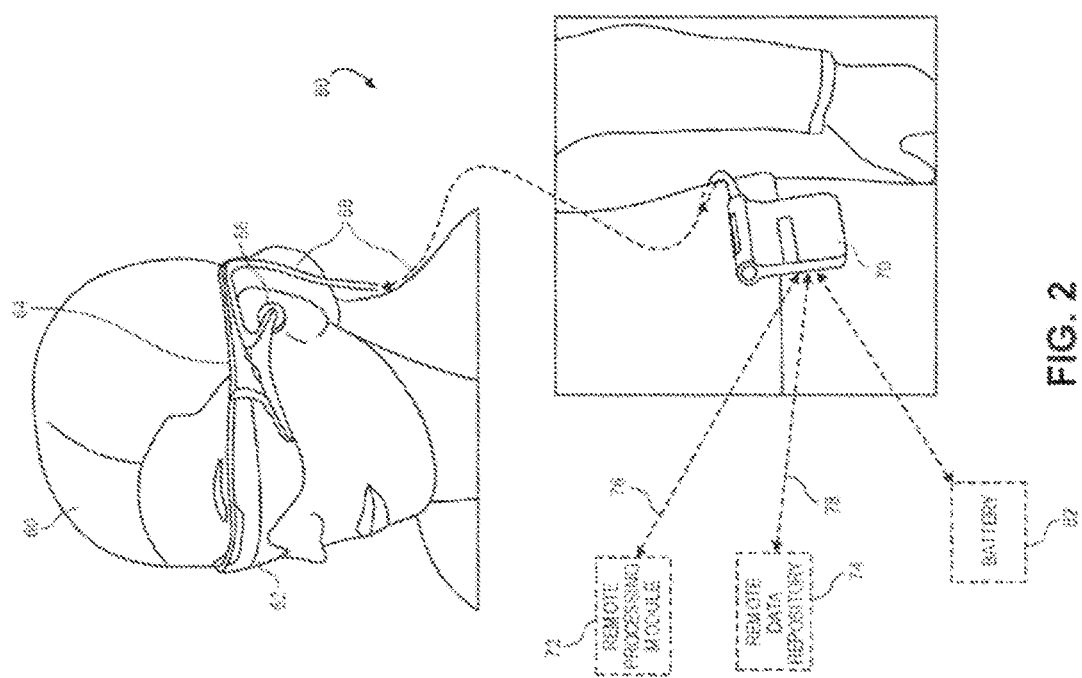
FIG. 2 is a schematic diagram illustrating an example of an AR display system, according to some embodiments.

Techniques as described herein may be used together or separately with many types of devices and for many types of scenes. FIG. 1 illustrates such a scene. FIGS. 2, 3A and 3B illustrate an exemplary AR system, including one or more processors, memory, sensors and user interfaces that may operate according to the techniques described herein.

Referring to FIG. 1, an AR scene 4 is depicted wherein a user of an AR system sees a physical world park-like setting 6, featuring people, trees, buildings in the background, and a concrete platform 8. In addition to these physical objects, the user of the AR technology also perceives that they "see" virtual objects, here illustrated as a robot statue 10 standing upon the physical world concrete platform 8, and a cartoon-like avatar character 2 flying by which seems to be a personification of a bumble bee, even though these elements (e.g., the avatar character 2, and the robot statue 10) do not exist in the physical world. Due to the extreme complexity of the human visual perception and nervous system, it is challenging to produce an AR system that facilitates a comfortable, natural-feeling, rich presentation of virtual image elements amongst other virtual or physical world imagery elements.

Such a scene may be presented to a user by presenting image information representing the actual environment around the user and overlaying information representing virtual objects that are not in the actual environment. In an AR system, the user may be able to see objects in the physical world, with the AR system providing information that renders virtual objects so that they appear at the appropriate locations and with the appropriate visual characteristics that the virtual objects appear to co-exist with objects in the physical world. In an AR system, for example, a user may look through a transparent screen, such that the user can see objects in the physical world. The AR system may render virtual objects on that screen such that the user sees both the physical world and the virtual objects. In some embodiments, the screen may be worn by a user, like a pair of goggles or glasses.

A scene may be presented to the user via a system that includes multiple components, including a user interface that can stimulate one or more user senses, including sight, sound, and/or touch. In addition, the system may include one or more sensors that may measure parameters of the physical portions of the scene, including position and/or motion of the user within the physical portions of the scene. Further, the system may include one or more computing devices, with associated computer hardware, such as memory. These components may be integrated into a single device or more be distributed across multiple interconnected devices. In some embodiments, some or all of these components may be integrated into a wearable device.

In some embodiments, an AR experience may be provided to a user through a wearable display system. FIG. 2 illustrates an example of wearable display system 80 (hereinafter referred to as "system 80"). The system 80 includes a head mounted display device 62 (hereinafter referred to as "display device 62"), and various mechanical and electronic modules and systems to support the functioning of the display device 62. The display device 62 may be coupled to a frame 64, which is wearable by a display system user or viewer 60 (hereinafter referred to as "user 60") and configured to position the display device 62 in front of the eyes of the user 60. According to various embodiments, the display device 62 may be a sequential display. The display device 62 may be monocular or binocular.

In some embodiments, a speaker 66 is coupled to the frame 64 and positioned proximate an ear canal of the user 60. In some embodiments, another speaker, not shown, is positioned adjacent another ear canal of the user 60 to provide for stereo/shapeable sound control.

System 80 may include local data processing module 70. Local data processing module 70 may be operatively coupled display device 62 through a communication link 68, such as by a wired lead or wireless connectivity. Local data processing module 70 may be mounted in a variety of configurations, such as fixedly attached to the frame 64, fixedly attached to a helmet or hat worn by the user 60, embedded in headphones, or otherwise removably attached to the user 60 (e.g., in a backpack-style configuration, in a belt-coupling style configuration). In some embodiments, local data processing module 70 may not be present, as the components of local data processing module 70 may be integrated in display device 62 or implemented in a remote server or other component to which display device 62 is coupled, such as through wireless communication through a wide area network.

The local data processing module 70 may include a processor, as well as digital memory, such as non-volatile memory (e.g., flash memory), both of which may be utilized to assist in the processing, caching, and storage of data. The data may include data a) captured from sensors (which may be, e.g., operatively coupled to the frame 64) or otherwise attached to the user 60, such as image capture devices (such as cameras), microphones, inertial measurement units, accelerometers, compasses, GPS units, radio devices, and/or gyros; and/or b) acquired and/or processed using remote processing module 72 and/or remote data repository 74, possibly for passage to the display device 62 after such processing or retrieval. The local data processing module 70 may be operatively coupled by communication links 76, 78, such as via a wired or wireless communication links, to the remote processing module 72 and remote data repository 74, respectively, such that these remote modules 72, 74 are operatively coupled to each other and available as resources to the local processing and data module 70.

In some embodiments, the local data processing module 70 may include one or more processors (e.g., a central processing unit and/or one or more graphics processing units (GPU)) configured to analyze and process data and/or image information. In some embodiments, the remote data repository 74 may include a digital data storage facility, which may be available through the Internet or other networking configuration in a "cloud" resource configuration. In some embodiments, all data is stored and all computations are performed in the local data processing module 70, allowing fully autonomous use from a remote module.

In some embodiments, the local data processing module 70 is operatively coupled to a battery 82. In some embodiments, the battery 82 is a removable power source, such as over the counter batteries. In other embodiments, the battery 82 is a lithium-ion battery. In some embodiments, the battery 82 includes both an internal lithium-ion battery chargeable by the user 60 during non-operation times of the system 80 and removable batteries such that the user 60 may operate the system 80 for longer periods of time without having to be tethered to a power source to charge the lithium-ion battery or having to shut the system 80 off to replace batteries.

FIG. 3A illustrates a user 30 wearing an AR display system rendering AR content as the user 30 moves through a physical world environment 32 (hereinafter referred to as "environment 32"). The user 30 positions the AR display system at positions 34, and the AR display system records ambient information of a passable world (e.g., a digital representation of the real objects in the physical world that can be stored and updated with changes to the real objects in the physical world) relative to the positions 34. Each of the positions 34 may further be associated with a "pose" in relation to the environment 32 and/or mapped features or directional audio inputs. A user wearing the AR display system on their head may be looking in a particular direction and tilt their head, creating a head pose of the system with respect to the environment. At each position and/or pose within the same position, sensors on the AR display system may capture different information about the environment 32. Accordingly, information collected at the positions 34 may be aggregated to data inputs 36 and processed at least by a passable world module 38, which may be implemented, for example, by processing on a remote processing module 72 of FIG. 2.

The passable world module 38 determines where and how AR content 40 can be placed in relation to the physical world as determined at least in part from the data inputs 36. The AR content is "placed" in the physical world by presenting the AR content in such a way that the user can see both the AR content and the physical world. Such an interface, for example, may be created with glasses that user can see through, viewing the physical world, and that can be controlled so that virtual objects appear in controlled locations within the user's field of view. The AR content is rendered as if it were interacting with objects in the physical world. The user interface is such that the user's view of objects in the physical world can be obscured to create the appearance that AR content is, when appropriate, obscuring the user's view of those objects. For example, AR content may be placed by appropriately selecting portions of an element 42 in environment 32 (e.g., a table) to display and displaying AR content 40 shaped and positioned as if it were resting on or otherwise interacting with that element 42. AR content may also be placed within structures not yet within a field of view 44 or relative to mapped mesh model 46 of the physical world.

As depicted, element 42 is an example of what could be multiple elements within the physical world that may be treated as if it is fixed and stored in passable world module 38. Once stored in the passable world module 38, information about those fixed elements may be used to present information to the user so that the user 30 can perceive content on the fixed element 42 without the system having to map to the fixed element 42 each time the user 30 sees it. The fixed element 42 may, therefore, be a mapped mesh model from a previous modeling session or determined from a separate user but nonetheless stored on the passable world module 38 for future reference by a plurality of users. Therefore, the passable world module 38 may recognize the environment 32 from a previously mapped environment and display AR content without a device of the user 30 mapping the environment 32 first, saving computation process and cycles and avoiding latency of any rendered AR content.

Similarly, the mapped mesh model 46 of the physical world can be created by the AR display system, and appropriate surfaces and metrics for interacting and displaying the AR content 40 can be mapped and stored in the passable world module 38 for future retrieval by the user 30 or other users without the need to re-map or model. In some embodiments, the data inputs 36 are inputs such as geolocation, user identification, and current activity to indicate to the passable world module 38 which fixed element 42 of one or more fixed elements are available, which AR content 40 has last been placed on the fixed element 42, and whether to display that same content (such AR content being "persistent" content regardless of user viewing a particular passable world model).

Even in embodiments in which objects are considered to be fixed, the passable world module 38 may be updated from time to time to account for the possibility of changes in the physical world. The model of fixed objects may be updated with a very low frequency. Other objects in the physical world may be moving or otherwise not regarded as fixed. To render an AR scene with a realistic feel, the AR system may update the position of these non-fixed objects with a much higher frequency than is used to update fixed objects. To enable accurate tracking of all of the objects in the physical world, an AR system may draw information from multiple sensors, including one or more image sensors.

FIG. 3B is a schematic illustration of a viewing optics assembly 48 and attendant components. Oriented to user eyes 49, in some embodiments, two eye tracking cameras 50 detect metrics of the user eyes 49 such as eye shape, eyelid occlusion, pupil direction and glint on the user eyes 49. In some embodiments, one of the sensors may be a depth sensor 51, such as a time of flight sensor, emitting signals to the world and detecting reflections of those signals from nearby objects to determine distance to given objects. A depth sensor, for example, may quickly determine whether objects have entered the field of view of the user, either as a result of motion of those objects or a change of pose of the user. However, information about the position of objects in the field of view of the user may alternatively or additionally be collected with other sensors. In some embodiments, world cameras 52 record a greater-than-peripheral view to map the environment 32 and detect inputs that may affect AR content. In some embodiments, the world camera 52 and/or camera 53 may be grayscale and/or color image sensors, which may output grayscale and/or color image frames at fixed time intervals. Camera 53 may further capture physical world images within a field of view of the user at a specific time. Pixels of a frame-based image sensor may be sampled repetitively even if their values are unchanged. Each of the world cameras 52, the camera 53 and the depth sensor 51 have respective fields of view of 54, 55, and 56 to collect data from and record a physical world scene, such as the physical world environment 32 depicted in FIG. 3A.

Inertial measurement units 57 may determine movement and/or orientation of the viewing optics assembly 48. In some embodiments, each component is operatively coupled to at least one other component. For example, the depth sensor 51 may be operatively coupled to the eye tracking cameras 50 to confirm actual distance of a point and/or region in the physical world that the user's eyes 49 are looking at.

It should be appreciated that a viewing optics assembly 48 may include some of the components illustrated in FIG. 3B. For example, a viewing optics assembly 48 may include a different number of components. In some embodiments, for example, a viewing optics assembly 48 may include two world camera 52 instead of four. Alternatively or additionally, cameras 52 and 53 need not capture a visible light image of their full field of view. A viewing optics assembly 48 may include other types of components. In some embodiments, a viewing optics assembly 48 may include one or more dynamic vision sensor (DVS), whose pixels may respond asynchronously to relative changes in light intensity exceeding a threshold.

In some embodiments, a viewing optics assembly 48 may not include the depth sensor 51 based on time of flight information. In some embodiments, for example, a viewing optics assembly 48 may include one or more plenoptic camera, whose pixels may capture not only light intensity but also an angle of incoming light. For example, a plenoptic camera may include an image sensor overlaid with a transmissive diffraction mask (TDM). Alternatively or additionally, a plenoptic camera may include an image sensor containing angle-sensitive pixels and/or phase-detection auto-focus pixels (PDAF) and/or micro-lens array (MLA). Such a sensor may serve as a source of depth information instead of or in addition to depth sensor 51.

It also should be appreciated that the configuration of the components in FIG. 3B is illustrated as an example. A viewing optics assembly 48 may include components with any suitable configuration such that a user can have the largest field of view for a particular set of components. For example, if a viewing optics assembly 48 has one world camera 52, the world camera may be placed in a center region of the viewing optics assembly instead of on the sides.

Information from these sensors in viewing optics assembly 48 may be coupled to one or more of the processors in the system. The processors may generate data that may be rendered so as to cause the user to perceive virtual content interacting with objects in the physical world. That rendering may be implemented in any suitable way, including generating image data that depicts both physical and virtual objects. In other embodiments, physical and virtual content may be depicted in one scene by modulating the opacity of a display device that a user looks through at the physical world. The opacity may be controlled so as to create the appearance of the virtual object and also to block the user from seeing objects in the physical world that are occluded by the virtual objects. In some embodiments, the image data may only include virtual content that may be modified to realistically interact with the physical world (e.g. clip content to account for occlusions), which may be viewed through the user interface. Regardless of how content is presented to a user, a model of the physical world may be used so that characteristics of the virtual objects, which can be impacted by physical objects, including the shape, position, motion and visibility of the virtual object, can be correctly computed.

The model of the physical world may be created from data collected from sensors on a wearable device of the user. In some embodiments, the model may be created from data collected by multiple users, which may be aggregated in a computing device remote from all of the users (and which may be "in the cloud").

In some embodiments, at least one of the sensors may be configured to acquire information about physical objects, particularly non-fixed objects, in a scene at a high frequency with low latency using compact and low power components. That sensor may employ patch tracking to limit the amount of data output.

Figure 4:
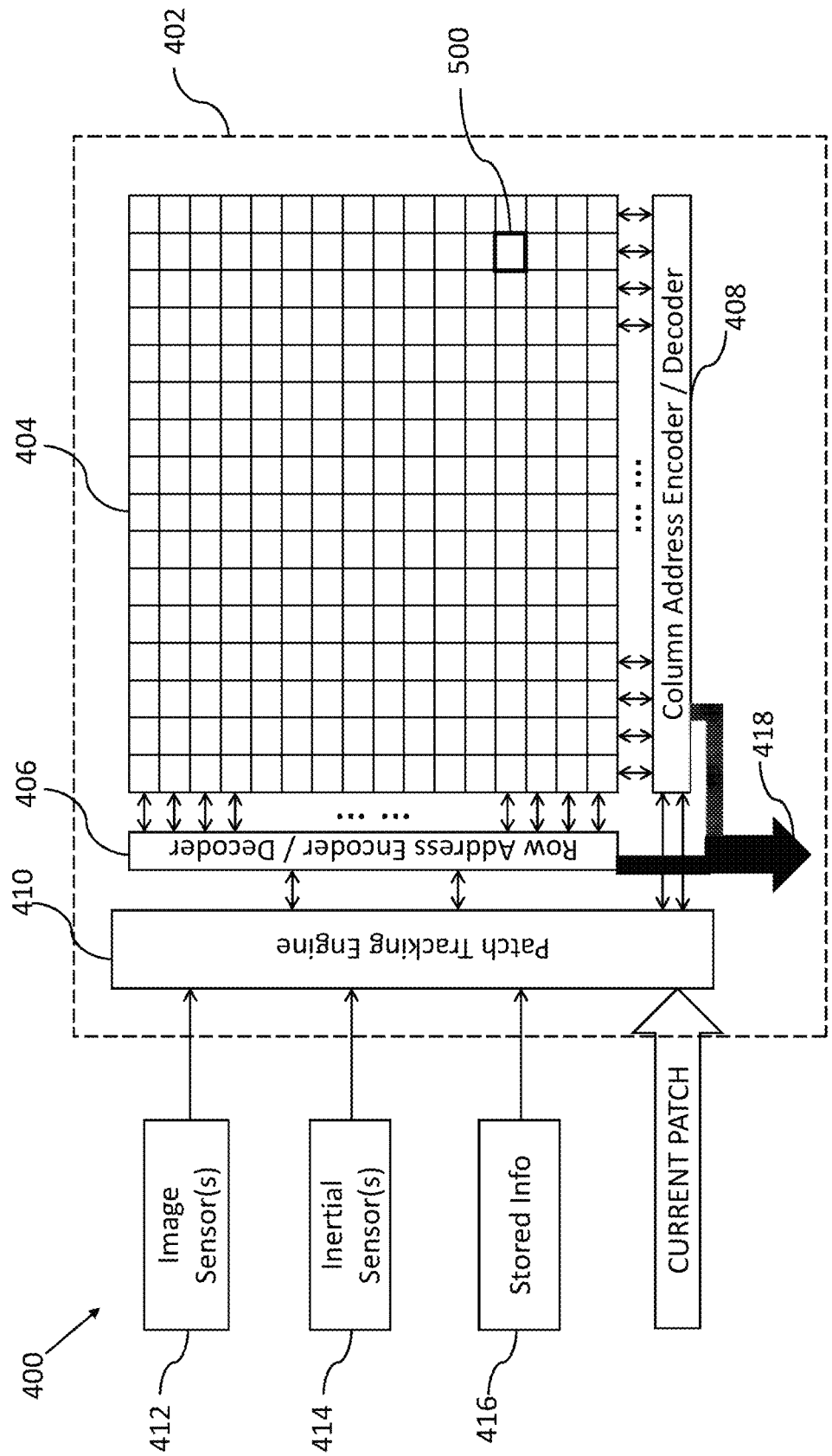
FIG. 4 is a schematic diagram illustrating an image sensing system, according to some embodiments.

FIG. 4 depicts an image sensing system 400, according to some embodiments. The image sensing system 400 may include an image sensor 402, which may include an image array 404, which may contain multiple pixels, each responsive to light, as in a conventional image sensor. Sensor 402 further may include circuit to access each pixel. Accessing a pixel may entail obtaining information about incident light generated by that pixel. Alternatively or additionally, accessing a pixel may entail controlling that pixel, such as by configuring it to provide an output only upon detection of some event.

In the illustrated embodiment, image array 404 is configured as an array with multiple rows and columns of pixels. In such an embodiment, the access circuit may be implemented as row address encoder/decoder 406 and column address encoder/decoder 408. Image sensor 402 may further contain circuitry that generates inputs to the access circuit to control the timing and order in which information is read out of pixels in image array 404. In the illustrated embodiment, that circuitry is patch tracking engine 410. In contrast to a conventional image sensor that may output image information captured by pixels in each row successively, image sensor 402 may be controlled to output image information in specified patches. Further, the locations of those patches with respect to the image array may change over time. In the embodiment illustrated, patch tracking engine 410 may output image array access information to control the output of image information from portions of the image array 404 corresponding to the location of patches, and the access information may change dynamically, based on estimates of the motion of objects in an environment and/or motion of the image sensor relative to those objects.

In some embodiments, the image sensor 402 may have the function of a dynamic vision sensor (DVS) such that the image information is provided by the sensor only when there is a change in an image property (e.g., intensity) for a pixel. For example, the image sensor 402 may apply one or more thresholds that define ON and OFF states of a pixel. The image sensor may detect that a pixel changed state and selectively provide outputs for only those pixels, or only those pixels in a patch, that changed state. These outputs may be made asynchronously as they are detected, rather than as part of a readout of all pixels in the array. The output, for example, may be in the form of address-event representation (AER) 418, which may include pixel addresses (e.g., row and column) and the types of event (ON or OFF). An ON event may indicate a pixel cell at a respective pixel address senses an increase in light intensity; and an OFF event may indicate a pixel cell at a respective pixel address senses a decrease in light intensity. The increase or decrease may be relative to an absolute level or may be a change relative to a level at the last output from the pixel. That change may be expressed as a fixed offset or as a percentage of the value at the last output from the pixel, for example.

Use of DVS techniques in connection with patch tracking may enable an image sensor suitable for use in XR systems. When combined in an image sensor, the amount of generated data may be limited to data from pixel cells that are within a patch and that detect a change that would trigger output of an event.

In some scenarios, high resolution image information is desirable. However, a large sensor, with over one million pixel cells, to generate high resolution image information might generate large amounts of image information when DVS techniques are used. The inventors have recognized and appreciated that a DVS sensor might produce a large number of events reflecting movement in the background or changes in an image other than as a result of motion of an object being tracked. Currently, resolutions of DVS sensors are limited to below 1 megapixel, for example, 128×128, 240×180, and 346×260 so as to limit the number of events generated. Such sensors sacrifice resolution for tracking objects, and might not, for example, detect fine finger movements of a hand. Moreover, if the image sensor outputs image information in other formats, limiting the resolution of sensor array to output a manageable number of events may also limit use of the image sensor for generating high-resolution image frames together with the DVS function. Sensors as described herein may have a resolution higher than VGA, including up to 8 megapixels or 12 megapixels, in some embodiments. Nonetheless, patch tracking as described herein may be used to limit the number of events output by the image sensor per second. As a result, image sensors that operate in at least two modes may be enabled. For example an image sensor with megapixel resolution may operate in a first mode in which it outputs events in specific patches being tracked. In a second mode, it may output high resolution image frames or portions of image frames. Such an image sensor may be controlled in an XR system to operate in these different modes based on the function of the system.

The image array 404 may include a plurality of pixel cells 500 arranged in an array. FIG. 5A depicts an example of the pixel cell 500, which in this embodiment is configured for use in an imaging array that implements DVS techniques. Pixel cell 500 may include a photoreceptor circuit 502, a differencing circuit 506, and a comparator 508. The photoreceptor circuit 502 may include a photodiode 504 that converts light striking the photodiode into a measurable electrical signal. In this example, the conversion is to an electrical current I. Transconductance amplifier 510 converts the photo current I into a voltage. That conversion may be linear or non-linear, such as according to a function of log I. Regardless of the specific transfer function, the output of transconductance amplifier 510 indicates the amount of light detected at photodiode 504. Although a photodiode is illustrated as an example, it should be appreciated that other light-sensitive components that produce a measurable output in response to incident light may be implemented in the photoreceptor circuit in place of or in addition of the photodiode.

In the embodiment of FIG. 5A, circuitry to determine whether the output of the pixel has changed sufficiently to trigger an output for that pixel cell is incorporated into the pixel itself. In this example, that function is implemented by differencing circuit 506 and comparator 508. The differencing circuit 506 may be configured to reduce DC mismatch between pixel cells by, for example, balancing the output of the differencing circuit to a reset level after the generation of an event. In this example, differencing circuit 506 is configured to produce an output showing a change in the output of photodiode 504 since the last output. The differencing circuit may include an amplifier 512 having a gain −A, a capacitor 514, which may be implemented as a single circuit element or one or more capacitors connected in a network, and a reset switch 516.

In operation, the pixel cell will be reset by momentarily closing switch 516. Such a reset may occur at the beginning of operation of the circuit as well as at any time thereafter that an event is detected. When the pixel 500 is reset, the voltage across capacitor 514 is such that, when subtracted from the output of transconductance amplifier 510, a zero voltage at the input of amplifier 512 results. When switch 516 opens, the output of transconductance amplifier 510 will be such that, in combination with the voltage drop across capacitor 514, there is a zero voltage at the input of amplifier 512. The output of transconductance amplifier 510 changes as a result of a change in the amount of light striking photodiode 504. When the output of transconductance amplifier 510 increases or decreases, the output of amplifier 512 will swing positive or negative, by the change amount, amplified by the gain of amplifier 512.

The comparator 508 may determine whether an event is generated and the sign of the event by, for example, comparing the output voltage V of the differencing circuit to a predetermined threshold voltage C. In some embodiments, the comparator 508 may include two comparators comprising transistors, one pair may operate when the output of amplifier 512 shows a positive change, and may detect increasing changes (ON events); the other comparator may operate when the output of amplifier 512 shows a negative change, and may detecting decreasing changes (OFF events). It should be appreciated, however, that amplifier 512 may have a negative gain. In such an embodiment, an increase in the output of transconductance amplifier 510 may be detected as a negative voltage change at the output of amplifier 512. Similarly, it should be appreciated that positive and negative voltages may be relative to earth ground or any suitable reference level. Regardless, the value of the threshold voltage C may be controlled by characteristics of the transistors (e.g., transistor sizes, transistor threshold voltages) and/or by values of the reference voltages that may be applied to the comparator 508.

Figure 5B:
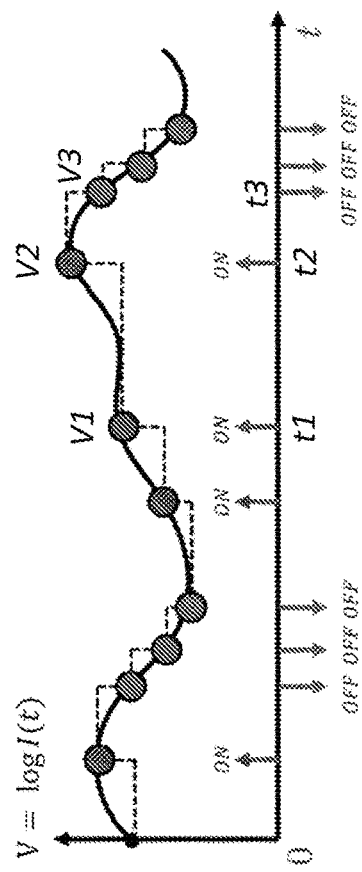
FIG. 5B is a schematic diagram illustrating an output events of the pixel cell of FIG. 5A, according to some embodiments.
Figure 5A:
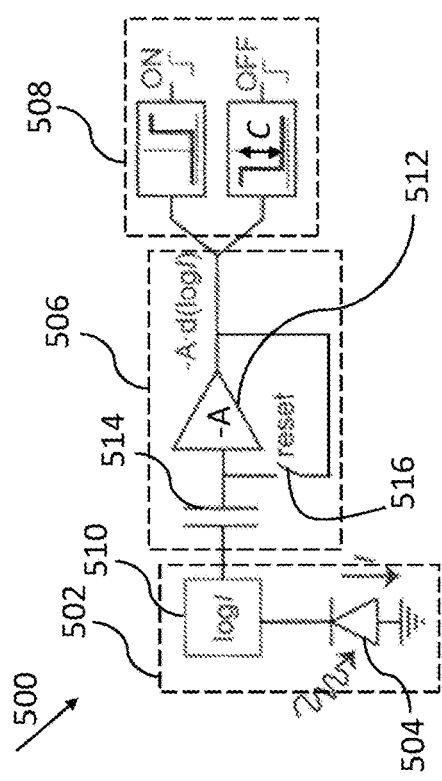
FIG. 5A is a schematic diagram illustrating a pixel cell in FIG. 4, according to some embodiments.

FIG. 5B depicts an example of event outputs (ON, OFF) of the pixel cell 500 over time t. In the illustrated example, at time t1, the output of the differencing circuit has a value of V1; at time t2, the output of the differencing circuit has a value of V2; and at time t3, the output of the differencing circuit has a value of V3. Between time t1 and time t2, although the photodiode senses some increases in light intensity, the pixel cell outputs no events because the changes of V does not exceed the value of the threshold voltage C. At time t2, the pixel cell outputs an ON event because V2 is larger than V1 by the value of the threshold voltage C. Between time t2 and time t3, although the photodiode senses some decreases in light intensity, the pixel cell outputs no events because the changes of V does not exceed the value of the threshold voltage C. At time t3, the pixel cell outputs an OFF event because V3 is less than V2 by the value of the threshold voltage C.

Each event may trigger an output at AER 418. The output may include, for example, an indication of whether the event is an ON or OFF event and an identification of the pixel, such as its row and column. Other information may alternatively or additionally be included with the output. For example, a time stamp might be included, which might be useful if events are queued for later transmission or processing. As another example, the current level at the output of amplifier 510 might be included. Such information might be optionally included, for example, if further processing, in addition to detecting motion of objects, is to be performed.

It should be appreciated that the frequency of the event outputs and thus the sensitivity of the pixel cell may be controlled by the value of the threshold voltage C. For example, the frequency of the event outputs may be reduced by increasing the value of the threshold voltage C, or increased by reducing the threshold voltage C. It should also be appreciated that the threshold voltage C may be different for an ON event and an OFF event by, for example, setting different reference voltages for the comparator for detecting an ON event and the comparator for detecting an OFF event. It should also be appreciated that a pixel cell may also output a value indicating the size of light intensity changes in place of or in addition to the sign signals that indicates the detection of events.

The pixel cell 500 of FIGS. 5A and 5B is illustrated as an example according to some embodiments. Other designs may also be suitable for a pixel cell. In some embodiments, a pixel cell may include the photoreceptor circuit and differencing circuit but share a comparator circuit with one or more other pixel cells. In some embodiments, a pixel cell may include circuitry configured to calculate values of changes, for example, an active pixel sensor at the pixel level.

Regardless of the manner in which events are detected for each pixel cell, the ability to configure pixels to output only upon detection of an event may be used to limit the amount of information required to maintain a model of the positions of non-fixed (i.e. movable) objects. For example, pixels within a patch may be set with a threshold voltage C triggered when a relatively small change occurs. Other pixels, outside of a patch, may have a larger threshold, such as three or five times. In some embodiments, the threshold voltage C for pixels outside of any patch may be set so large that the pixel is effectively disabled and does not produce any output, regardless of the amount of change. In other embodiments, pixels outside a patch may be disabled in other ways. In such an embodiment, the threshold voltage may be fixed for all pixels, but pixels may be selectively enabled or disabled based on whether they are within a patch.

In yet other embodiments, the threshold voltage for one or more pixels may be set adaptively as a way to modulate the amount of data output from an image array. For example, an AR system may have processing capacity to process a number of events per second. The threshold for some or all pixels may be increased when the number of events per second being output exceeds an upper limit. Alternatively or additionally, the threshold might be lowered when the number of events per second dropped below a lower limit, enabling more data for more accurate processing. The number of events per second, as a specific example, may be between 200 and 2,000 events. Such a number of events constitutes a substantial reduction in the number of pieces of data to be processed per second compared, for example, to processing all of the pixel values scanned out from an image sensor, which would constitute 30 million or more pixel values per second. That number of events is even a reduction in comparison to processing just the pixels within a patch, which may be lower, but nonetheless may be multiple tens of thousands of pixel values or more per second.

The control signals to enable and/or set threshold voltages for each of multiple pixels may be generated in any suitable way. However, in the illustrated embodiment, those control signals are set by patch tracking engine 410 or based on processing within processing module 72 or other processor.

Referring back to FIG. 4, the image sensing system 400 may receive inputs from any suitable components such that the patch tracking engine 410 may dynamically select at least one region of the image array 404 to be enabled and/or disabled based at least on the received inputs so as to implement the patch. Patch tracking engine 410 may be digital processing circuitry that has memory, storing one or more parameters of a patch. The parameters may be, for example, the boundaries of the patch, and may include other information, such as information about scale factors between motion of the image array and motion within the image array of an image of a movable object associated with the patch. Patch tracking engine 410 may also include circuitry configured to perform calculations on the stored values and other measured values supplied as inputs.

In the illustrated embodiment, patch tracking engine 410 receives as an input a designation of a current patch. The patch may be designated based on its size and position within image array 404, such as by specifying a range of row and column addresses of the patch. Such a specification may be provided as an output of processing module 72 (FIG. 2) or other components processing information about the physical world. Processing module 72, for example, may designate a patch to encompass the current location of each movable object within the physical world or a subset of movable objects that are being tracked in order to render a virtual object with appropriate appearance with respect to the physical world. For example, if an AR scene is to include as a virtual object a toy doll balanced on a physical object such as a moving toy car, a patch may be designated encompassing that toy car. A patch might not be designated for another toy car, moving in the background, as there may be less need to have up-to-date information about that object in order to render a realistic AR scene.

Regardless of how the patch is selected, information about the current position of the patch may be supplied to patch tracking engine 410. In some embodiments, patches may be rectangular, such that the location of the patch may be simply specified as a beginning and ending row and column. In other embodiments, patches may have other shapes, such as circular and the patch may be specified in other ways, such as by a center point and a radius.

In some embodiments, trajectory information may also be supplied about the patch. The trajectory, for example, may specify motion of the patch with respect to coordinates of image array 404. Processing module 72, for example, may construct a model of the motion of the movable object within the physical world and/or the motion of the image array 404 with respect to the physical world. As motion of either or both may affect the location within image array 404 where an image of an object is projected, the trajectory of a patch within the image array 404 may be computed based on either or both. The trajectory may be specified in any suitable way, such as the parameters of a linear, quadratic, cubic or other polynomial equation.

In other embodiments, patch tracking engine 410 may dynamically compute the location of a patch based on inputs from sensors providing information about the physical world. Information from the sensors may be supplied directly from the sensors. Alternatively or additionally, the sensor information may be processed to extract information about the physical world before being supplied to patch tracking engine 410. Extracted information, for example, may include motion of image array 404 with respect to the physical world, distance between image array 404 and an object whose image falls within a patch or other information that may be used to dynamically align a patch in the image array 404 with an image of an object in the physical world as image array 404 and/or the object moves.

Examples of the input components may include image sensors 412 and inertial sensors 414. Examples of the image sensors 412 may include the eye tracking cameras 50, depth sensor 51, world cameras 52 and/or camera 52. Examples of the inertial sensors 414 may include inertial measurement units 57. In some embodiments, input components may be selected to provide data at a relatively high rate. Inertial measurement units 57, for example, may have an output rate between 200 and 2,000 measurements per second, such as between 800 and 1,200 measurements per second. The patch position may be updated at a similarly high rate. By using inertial measurement units 57 as a source of input to patch tracking engine 410, the location of a patch may be updated 800 to 1,200 times per second, as one specific example. In this way, a movable object may be tracked with high accuracy, using a relatively small patch that limits the number of events that need to be processed. Such an approach may lead to very low latency between a change of relative position of the image sensor and a movable object, with similarly low latency of updates to the rendering of virtual objects so as to provide a desirable user experience.

In some scenarios, a movable object being tracked with a patch may be a stationary object within the physical world. The AR system, for example, may identify stationary objects from analyzing multiple images taken of the physical world and select features of one or more of the stationary objects as reference points for determining motion of a wearable device having image sensors on it. Frequent and low latency updates of the locations of these reference points relative to a sensor array may be used to provide frequent and low latency computations of head pose of a user of the wearable device. As head pose may be used to realistically render virtual objects via a user interface on the wearable, frequent and low latency updates of head pose improves the user experience of the AR system. Thus, having inputs to patch tracking engine 410 that control the position of a patch come only from sensors with a high output rate, such as one or more inertial measurement units, may lead to a desirable user experience of the AR system.

However, in some embodiments, other information may be supplied to patch tracking engine 410 to enable it to compute and/or apply a trajectory to a patch. This other information may include stored information 416, such as the passable world module 38 and/or mapped mesh model 46. This information may indicate one or more prior positions of an object relative to the physical world such that consideration of changes of these prior positions and/or changes in the current position relative to the prior positions may indicate a trajectory of an object in the physical world, which might then be mapped to a trajectory of a patch across image array 404. Other information in a model of a physical world may alternatively or additionally be used. For example, the size of a movable object and or distance or other information on position relative to image array 404 may be used to compute either a location or trajectory of a patch across image array 404 associated with that object.

Regardless of the manner in which the trajectory is determined, patch tracking engine 410 may apply that trajectory to compute an updated location of the patch within the image array 404 at a high rate, such as faster than once per second or more than 800 times per. The rate may be limited by processing capability, so as to be less than 2,000 times per second, in some embodiments It should be appreciated that the processing to track changes in a movable object may be less than to reconstruct the full physical world. However, there may be a reconstruction of the physical world at intervals longer than the intervals between updates in the positions of movable objects, such as every 30 seconds or every 5 seconds. The location of objects to track, and the location of a patch that will capture information about those objects may be recalculated when there is a reconstruction of the physical world.

FIG. 4 illustrates an embodiment in which the processing circuitry to both dynamically generate a patch and control the selective outputting of image information from within that patch is configured to control image array 404 directly so that image information output from the array is limited to the selected information. Such circuitry, for example, may be integrated into the same semiconductor chip that houses the image array 404 or may be integrated to a separate controller chip for image array 404. However, it should be appreciated that the circuitry generating the control signals for image array 404 may be distributed throughout an AR system. For example, some or all of the functions may be performed by programming in processing module 72 or other processor within the system.

The image sensing system 400 may output image information, for each of a plurality of pixels. Each pixel of the image information may correspond to one of the pixel cells of the image array 404. The output image information from the image sensing system 400 may be image information for each of one or more patches corresponding to the at least one region of the image array 404, selected by the patch tracking engine 410. In some embodiments, such as when each pixel of the image array 404 has a differential configuration than as illustrated in FIG. 5A, the pixels in the output image information may identify pixels for which a change of light intensity was detected by the image sensor 400 within one or more patches.

In some embodiments, the output image information from the image sensing system 400 may be image information for pixels outside each of one or more patches corresponding to the at least one region of the image array, selected by the patch tracking engine 410. For example, a deer may be running in a physical world with a running river. Details of river waves may not be of interest, but may trigger pixel cells of the image array 402. The patch tracking engine 410 may create a patch enclosing the river, and disable a portion of the image array 402 corresponding to the patch enclosing the river.

Based on the identification of changed pixels, further processing may be performed. For example, portions of a world model corresponding to portions of the physical world being imaged by the changed pixels may be updated. These updates may be performed based on information collected with other sensors. In some embodiments, further processing may be conditioned on or triggered by multiple changed pixels in a patch. For example, updates may be performed once 10%, or some other threshold amount of pixels, in a patch detect a change.

In some embodiments, image information in other formats may be output from an image sensor, and may be used in combination with change information to make updates to a world model. In some embodiments, the format of the image information output from the image sensor may change from time to time during operation of a VR system. In some embodiments, for example, pixel cells 500 may be operated to produce at some times differential outputs, such as are produced in comparators 508. The output of amplifier 510 may be switchable to output at other times the magnitude of light incident on photodiode 504. For example, the output of amplifier 510 may be switchably connected to a sense line that is, in turn connected to an A/D converter that can provide a digital indication of the magnitude of the incident light based on the magnitude of the output of amplifier 510.

An image sensor in this configuration may be operated as part of an AR system to output differentially most of the time, outputting an event only for pixels for which a change above a threshold is detected or outputting an event only for pixels within a patch for which a change above a threshold is detected. Periodically, such as every 5 to 30 seconds, a full image frame, with magnitude information for all pixels in the image array may be output. Low latency and accurate processing may be achieved in this way, with the differential information being used to quickly update selected portions of a world model for which changes most likely to affect user perception occurred whereas the full image may be used to more update larger portions of the world model. Though the full updates to the world model occur only at the slower rate, any delay in updating the model may not meaningfully impact the user's perception of the AR scene.

The output mode of the image sensor may be changed from time to time throughout the operation of the image sensor such that the sensor outputs one or more of intensity information for some or all of the pixels and an indication of a change for some or all of the pixels in the array.

Figure 6:
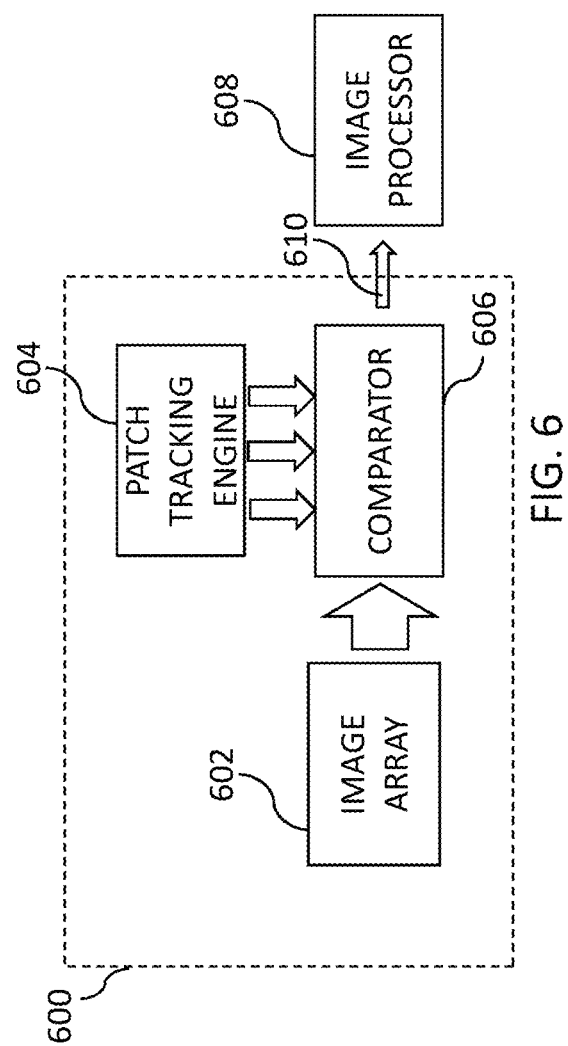
FIG. 6 is a schematic diagram illustrating an image sensor, according to some embodiments.

It is not a requirement that image information from patches be selectively output from an image sensor by limiting the information output from the image array. In some embodiments, image information may be output by all pixels in the image array and only information about specific regions of the array may be output from the image sensor. FIG. 6 depicts an image sensor 600, according to some embodiments. The image sensor 600 may include an image array 602. In this embodiment, image array 602 may be similar to a conventional image array that scans out rows and columns of pixel values. Operation of such an image array may be adapted by other components. The image sensor 600 may further include patch tracking engine 604, and/or comparator 606. Image sensor 600 may provide an output 610 to an image processor 608. Processor 608, for example, may be a portion of processing module 72 (FIG. 2).

Patch tracking engine 604 may have a structure and function similar to patch tracking engine 410. It may be configured to receive signals specifying at least one selected region of the image array 602 and then generate control signals specifying a dynamic location of that region based on a computed trajectory within image array 602 of an image of an object represented by that region. In some embodiments, the patch tracking engine 604 may receive signals specifying at least one selected region of the image array 602, which may include trajectory information for the region or regions. The patch tracking engine 604 may be configured to perform computations that dynamically identify pixel cells within the at least one selected region based on the trajectory information. Variations in the implementation of patch tracking engine 604 are possible. For example, the patch tracking engine may update the location of the patch based on sensors indicating motion of the image array 602 and/or projected motion of an object associated with the patch.

In the embodiment illustrated in FIG. 6, image sensor 600 is configured to output differential information for pixels within identified patches. Comparator 606 may be configured to receive control signals from patch tracking engine 604 that identify pixels within the patch. Comparator 606 may selectively operate on pixels being output from image array 602 that have addresses within the patch as indicated by patch tracking engine 604. Comparator 606 may operate on the pixel cells so as to generate signals indicating a change in sensed light detected by the at least one region of the image array 602. As one example of an implementation, comparator 606 may contain memory elements storing reset values of pixel cells within the array. As current values of those pixels are scanned out of image array 602, circuitry within comparator 606 may compare the stored value to the current value and output an indication when the difference exceeds a threshold. Digital circuitry, for example, may be used to store values and make such a comparison. In this example, the output of image sensor 600 may be processed like the output of image sensor 400.

In some embodiments, the image array 602, patching tracking engine 604, and the comparator 606 may be implemented in a single integrated circuit, such as a CMOS integrated circuit. In some embodiments, the image array 602 may be implemented in a single integrated circuit. The patch tracking engine 604 and comparator 606 may be implemented in a second single integrated circuit, configured as, for example, a driver for the image array 602. Alternatively or additionally, some or all of the functions of patch tracking engine and/or comparator 606 may be distributed to other digital processors within the AR system.

Figure 7:
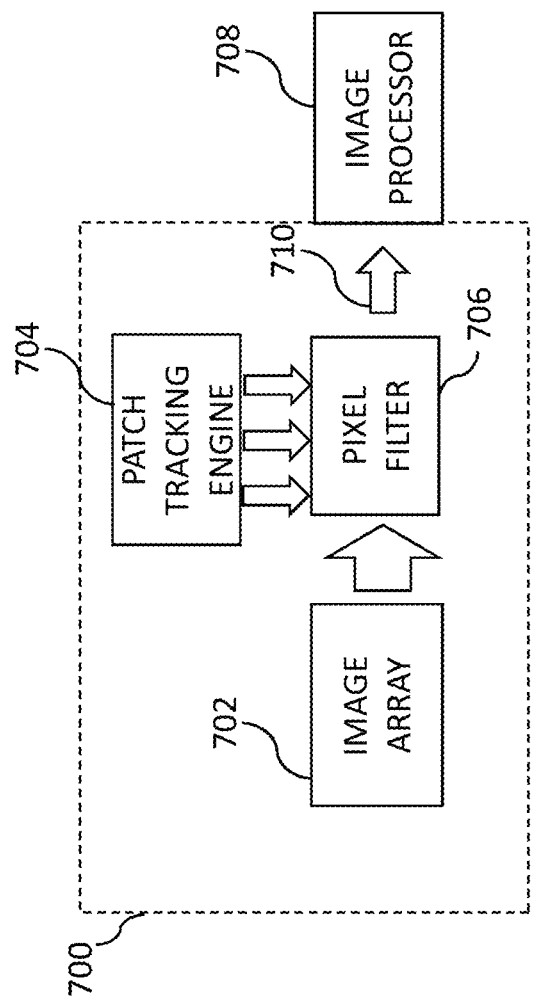
FIG. 7 is a schematic diagram illustrating an image sensor, according to some embodiments.

Other configurations or processing circuitry are also possible. FIG. 7 depicts an image sensor 700, according to some embodiments. The image sensor 700 may include an image array 702. In this embodiment, image array 702 may have pixel cells with a differential configuration, such as is shown for pixel 500 in FIG. 5A. However, the embodiments herein are not limited to differential pixel cells as patch tracking may be implemented with image sensors that output intensity information.

In the illustrated embodiment of FIG. 7, patch tracking engine 704 produces control signals indicating addresses of the pixel cells within one or more patches being tracked. Patch tracking engine 704 may be constructed and operate like patch tracking engine 604. Here, patch tracking engine 704 provides control signals to pixel filter 706, which passes to output 710 image information from only those pixels within a patch. As shown, output 710 is coupled to an image processor 708, which may further process the image information for pixels within a patch using techniques as described herein or in other suitable ways.

Figure 8:
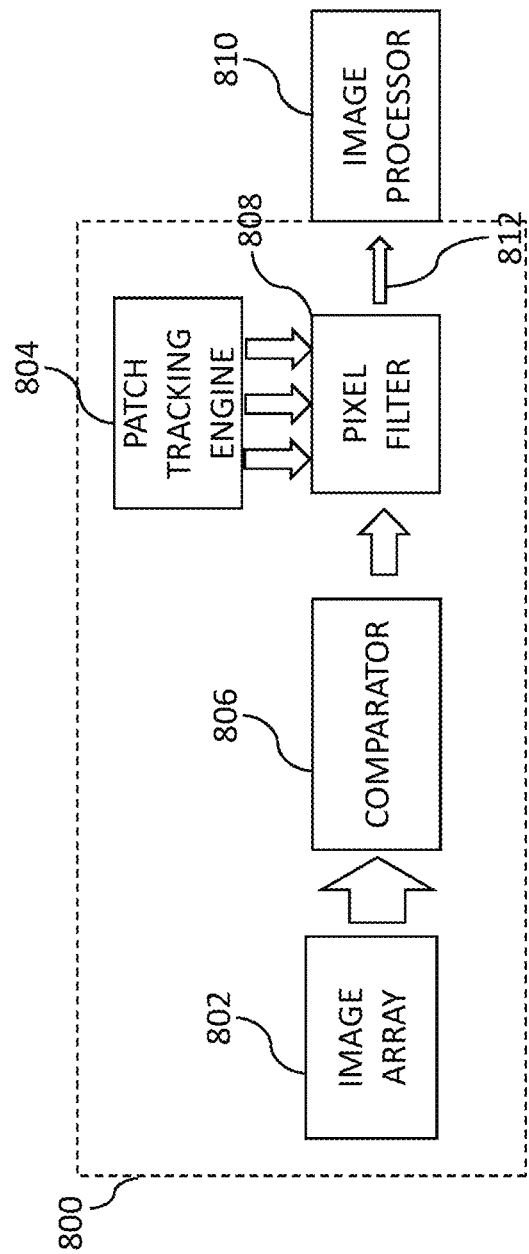
FIG. 8 is a schematic diagram illustrating an image sensor, according to some embodiments.

A further variation is illustrated in FIG. 8, which depicts an image sensor 800, according to some embodiments. Image sensor 800 may include an image array 802, which may be a conventional image array that scans out intensity values for pixels. That image array may be adapted to provide differential image information as described herein through the use of comparator 806. Comparator 806 may, similarly to comparator 606, compute difference information based on stored values for the pixels. Selected ones of those difference values may be passed to output 812 by pixel filter 808. As with pixel filter 706, pixel filter 808 may receive control inputs from a patch tracking engine 804. Patch tracking engine 804 may be similar to patch tracking engine 704. Output 812 may be coupled to an image processor 810. Some or all of the above-mentioned components of the image sensor 800 may be implemented in a single integrated circuit. Alternatively, the components may be distributed across one or more integrated circuits or other components.

Figure 9:
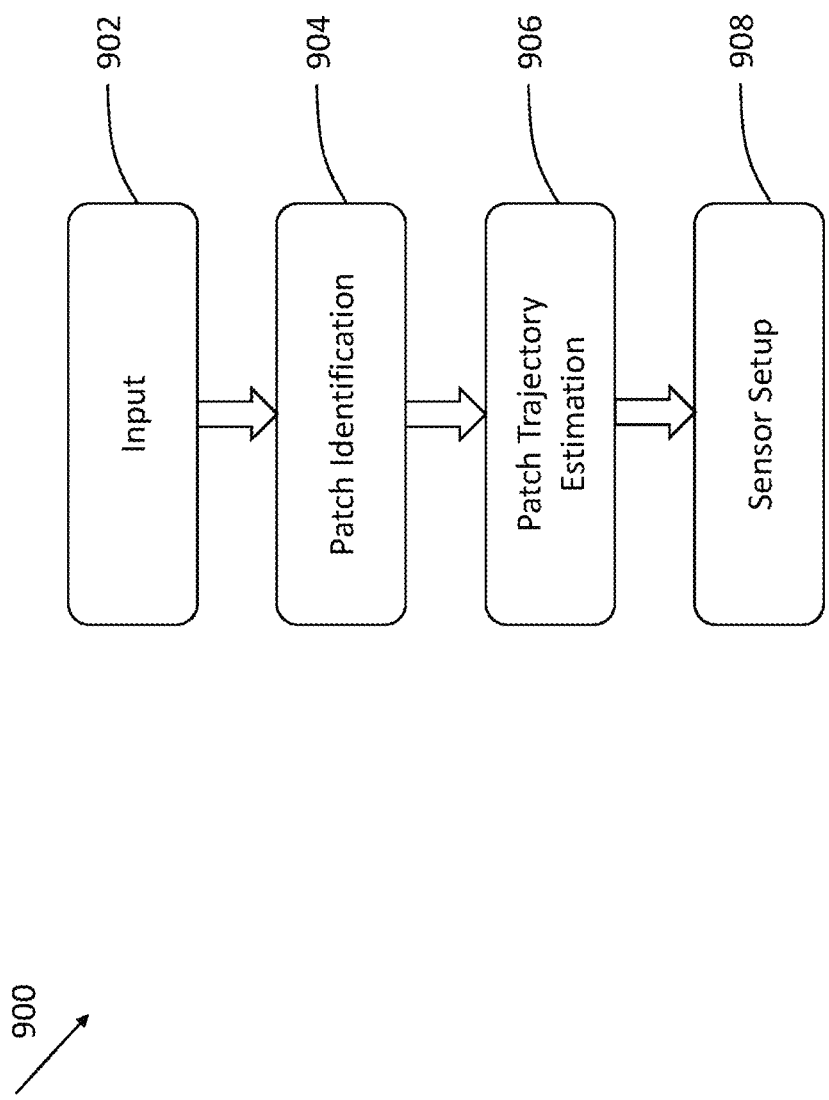
FIG. 9 is a simplified flow chart of a method for image sensing, according to some embodiments.

Image sensors as described herein may be operated as part of an augmented reality system to maintain information about movable objects or other information about a physical world useful in rendering images of virtual objects realistically in combination with information about a physical environment. FIG. 9 depicts a method 900 for image sensing, according to some embodiments.

Figure 10:
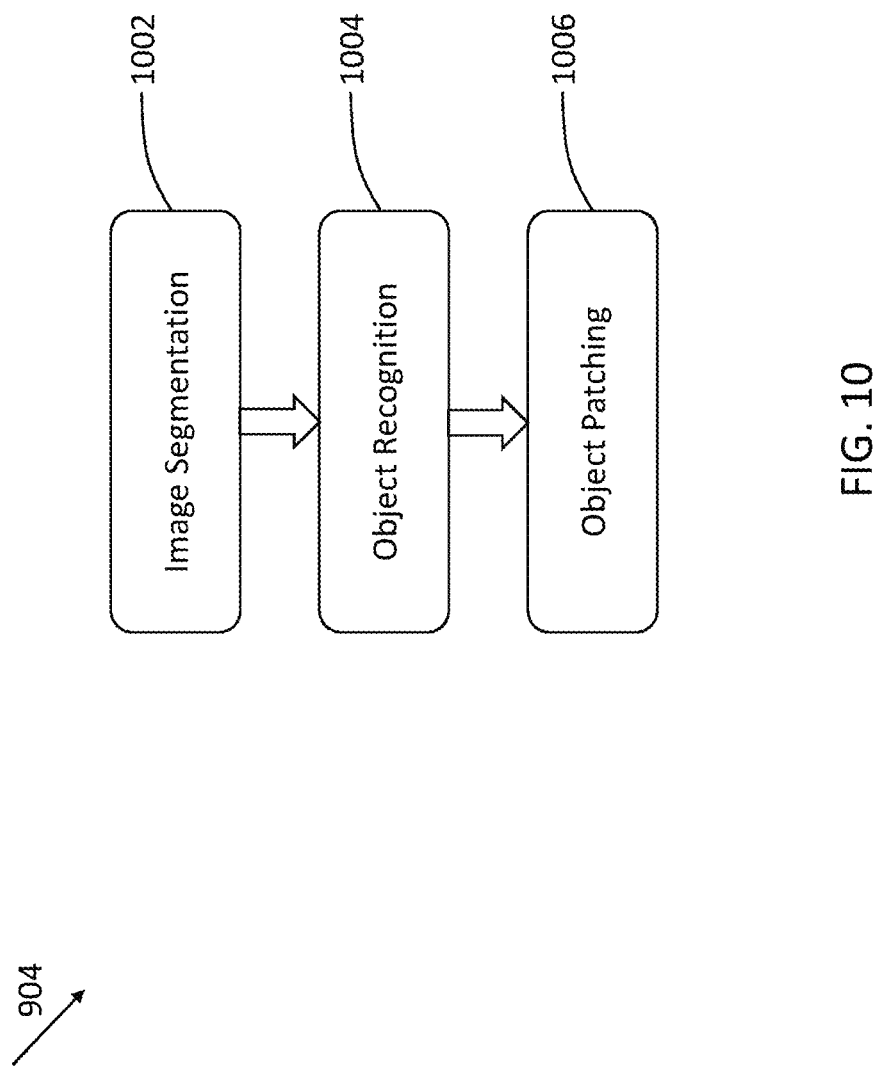
FIG. 10 is a simplified flow chart of the act of patch identification of FIG. 9, according to some embodiments.
Figure 11:
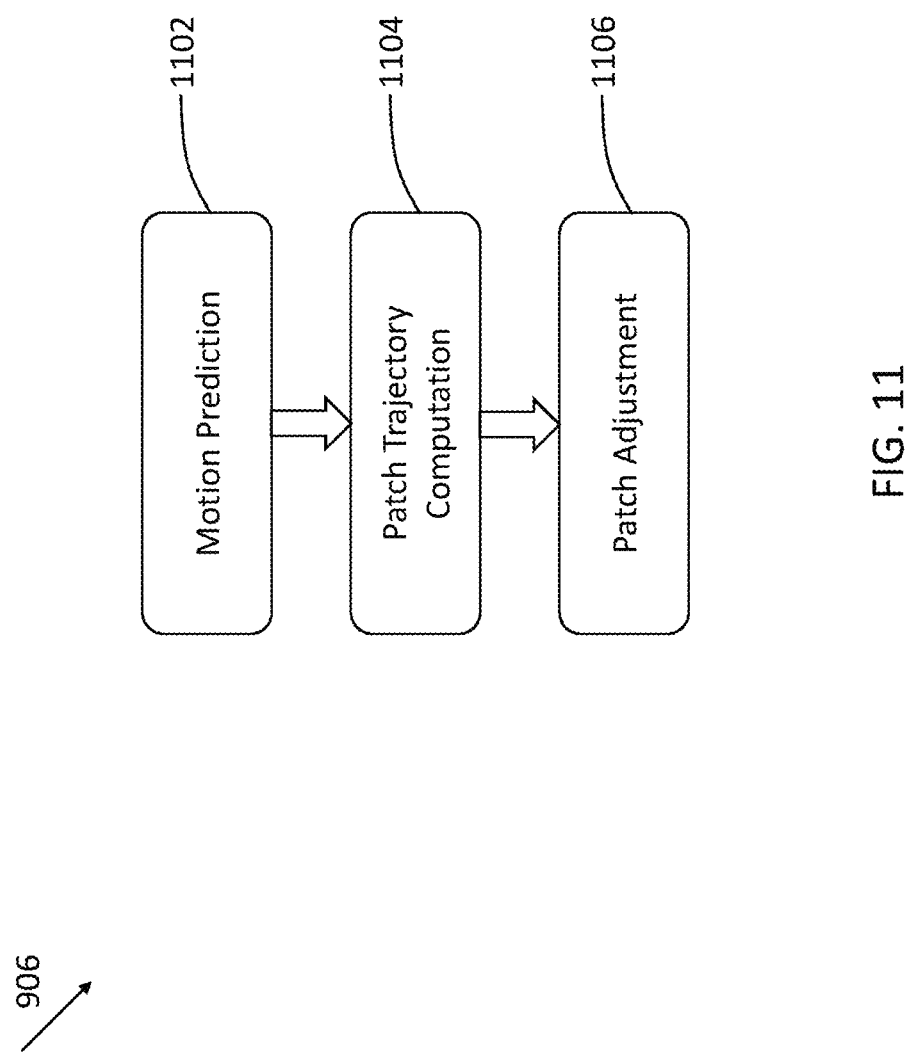
FIG. 11 is a simplified flow chart of the act of patch trajectory estimation of FIG. 9, according to some embodiments.

At least a part of the method 900 may be performed to operate an image sensor including, for example, the image sensors 400, 600, 700 or 800. The method 900 may start from receiving (act 902) imaging information from one or more inputs including, for example, the image sensors 412, inertial sensors 414, and stored information 416. The method 900 may include identifying (act 904) one or more patches on an image output of the image sensing system based at least in part on the received information. An example of act 904 is illustrated in FIG. 10. In some embodiments, the method 900 may include computing (act 906) moving trajectories for the one or more patches. An example of act 906 is illustrated in FIG. 11.

The method 900 may also include setting (act 908) the image sensing system based at least in part on the identified one or more patches and/or their estimated moving trajectories. The setup may be achieved by enabling a portion of pixel cells of the image sensing system based at least in part on the identified one or more patches and/or their estimated moving trajectories through, for example, the comparator 606, pixel filter 706 and so on. In some embodiments, the comparator 606 may receive a first reference voltage value for pixel cells corresponding to a selected patch on the image, and a second reference voltage value for pixel cells not corresponding to any selected patches on the image. The comparator 606 may set the second reference voltage to be much higher than the first reference voltage such that no reasonable light intensity changes sensed by a pixel cell, which has a comparator cell with the second reference voltage, can result in an output by the pixel cell. In some embodiments, the pixel filter 706 may disable outputs from pixel cells with addresses (e.g., row and column), which do not correspond to any selected patches on the image.

FIG. 10 depicts the patch identification 904, according to some embodiments. The patch identification 904 may include segmenting (act 1002) one or more images from the one or more inputs based at least in part on color, light intensity, angle-of arrival, depth, and semantics.

The patch identification 904 may also include recognizing (act 1004) one or more objects in the one or more images. In some embodiments, the object recognition 1004 may be based at least in part on predetermined features of the object including, for example, hand, eye, face features. In some embodiments, the object recognition 1004 may be based on one or more virtual objects. For example, a virtual animal character is walking on a physical pencil. The object recognition 1004 may target the virtual animal character as the object. In some embodiments, the object recognition 1004 may be based at least in part on artificial intelligence (AI) training received by the image sensing system. For example, the image sensing system may be trained by reading images of cats in different types and colors, and thus learned characteristics of a cat and capable of identifying a cat in a physical world.

The patch identification 904 may include generating (act 1006) the patch based on the one or more objects. In some embodiments, the object patching 1006 may generate the patch by computing convex hulls or bounding boxes for the one or more objects.

FIG. 11 depicts the patch trajectory estimation 906, according to some embodiments. The patch trajectory estimation 906 may include predicting (act 1102) movements for the one or more patches over time. The movements for the one or more patches may be caused by multiple reasons including, for example, a moving object and/or a moving user. The motion prediction 1102 may include deriving moving velocities for a moving object and/or a moving user based on received images and/or received AI training.

The patch trajectory estimation 906 may include computing (act 1104) trajectories for the one or more patches over time based at least in part on the predicted movements. In some embodiments, a trajectory may be computed by modeling with a first order linear equation, assuming an object in motion will continue moving with the same velocity in the same direction. In some embodiments, a trajectory may be computed by curve fitting or using heuristics, including pattern detection.

Figure 12:
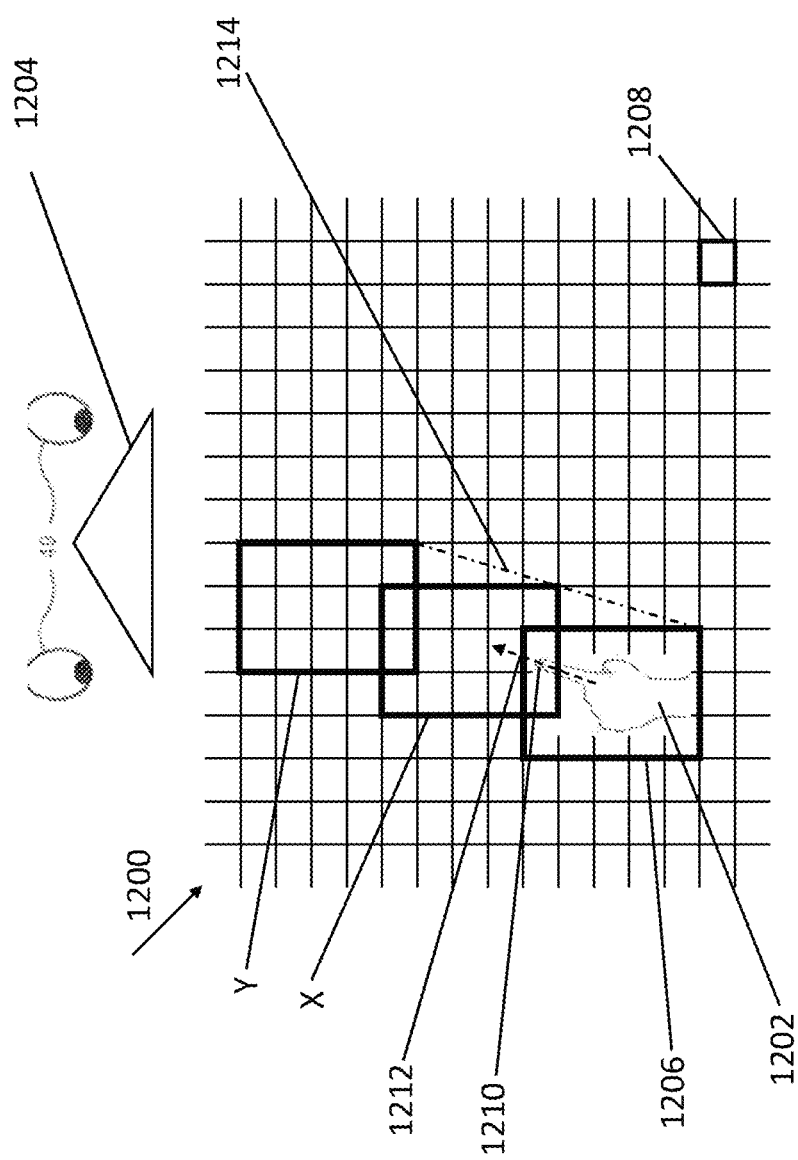
FIG. 12 is a schematic diagram illustrating the patch trajectory estimation of FIG. 11 with respect to one viewpoint, according to some embodiments.
Figure 13:
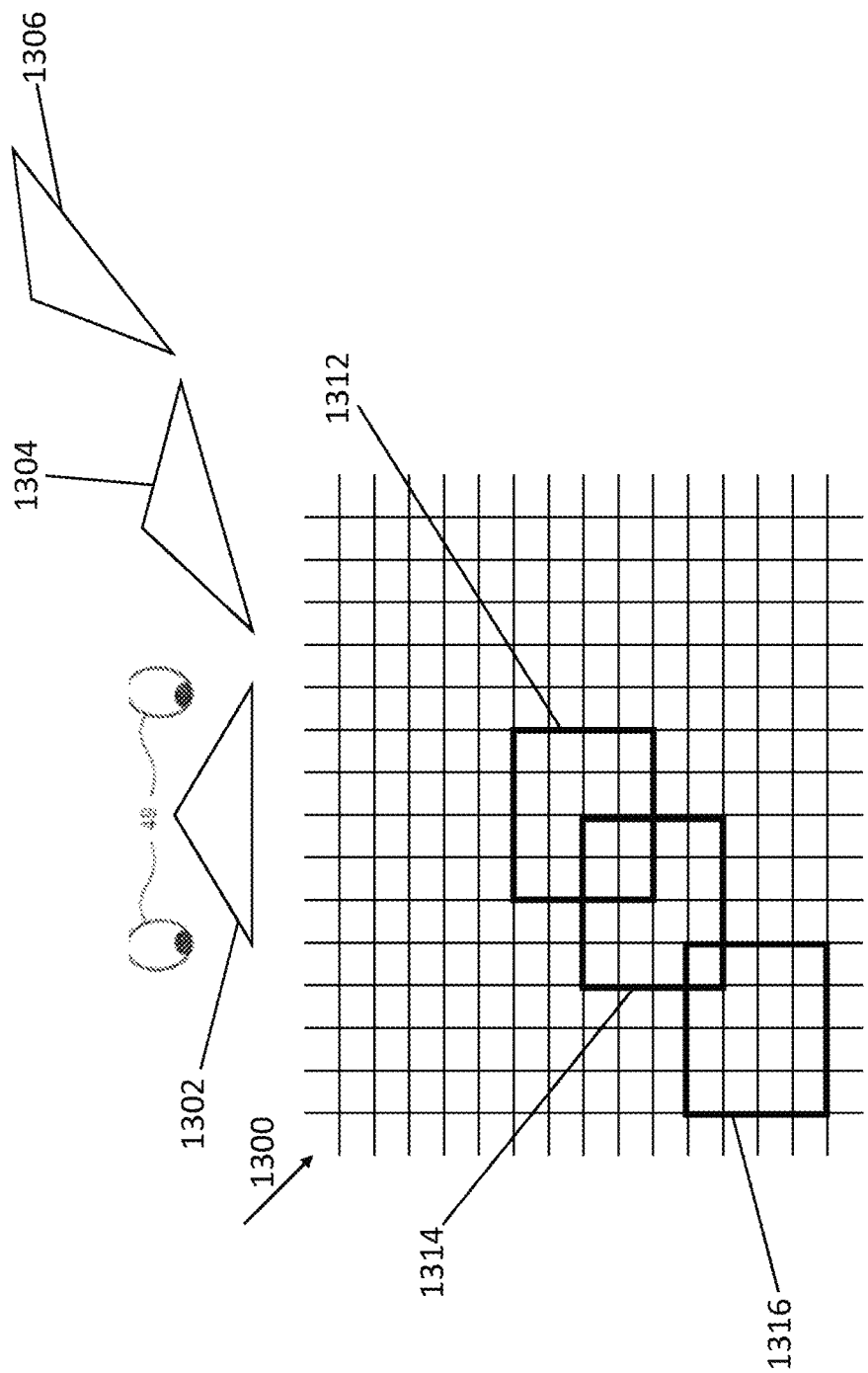
FIG. 13 is a schematic diagram illustrating the patch trajectory estimation of FIG. 11 with respect to viewpoint changes, according to some embodiments.

FIGS. 12 and 13 illustrate factors that may be applied in a calculation of patch trajectory. FIG. 12 depicts an example of a movable object, which in this example is moving object 1202 (e.g., a hand) that is moving relative to the user of an AR system. In this example, a user is wearing an image sensor as part of the head mounted display 62. In this example, the user's eyes 49 are looking straight ahead such that an image array 1200 captures a field of view (FOV) for eyes 49 with respect to one viewpoint 1204. Object 1202 is in the FOV and therefore appears, by creating intensity variations, in corresponding pixels in array 1200.

The array 1200 has a plurality of pixels 1208 arranged in an array. For a system tracking hand 1202, a patch 1206 in that array encompassing object 1202 at a time t0 may include a portion of the plurality of pixels. If object 1202 is moving, the location of a patch capturing that object will change over time. That change may be captured in a patch trajectory, from patch 1206 to patches X and Y used at later times.

The patch trajectory may be estimated, such as in act 906, by identifying a feature 1210 for the object in the patch, for example, a fingertip in the illustrated example. A motion vector 1212 may be computed for the feature. In this example, the trajectory is modeled as a first order linear equation and the prediction is based on an assumption that the object 1202 will continue on that same patch trajectory 1214 over time, leading to patch locations X and Y at each of two successive times.

As the patch location changes, the image of moving object 1202 stays within the patch. Even though image information is limited to information gathered with pixels within the patch, that image information is adequate to represent motion of the moving object 1202. Such will be the case whether the image information is intensity information or differential information as produced by a differencing circuit. In the case of a differencing circuit, for example, an event indicating an increase of intensity might occur as the image of moving object 1202 moves over a pixel. Conversely, when the image of moving object 1202 passes on from a pixel, an event indicating a decrease of intensity might occur. The pattern of pixels with increasing and decreasing events may be used as a reliable indication of motion of moving object 1202, that can be rapidly updated with low latency due to a relatively small amount of data indicating the events. As a specific example, such a system may lead to a realistic AR system that tracks a user's hand and alters the rendering of virtual objects to create the sense for the user that the user is interacting with the virtual objects.

A position of a patch may change for other reasons, and any or all of which may be reflected in the trajectory computation. One such other change is movement of the user when the user is wearing the image sensor. FIG. 13 depicts an example of a moving user, which creates a changing viewpoint for the user as well as the image sensor. In FIG. 13, the user may initially be looking straight ahead at an object with a view point 1302. In this configuration, a pixel array 1300 of an image array will capture objects in front of the user. An object in front of the user may be in patch 1312.

The user may then change the view point, such as by turning their head. The view point may change to view point 1304. Even if the object, previously directly in front of the user, does not move, it will have a different position within the field of view of the user at view point 1304. It will also be at a different point within the field of view of an image sensor worn by the user and therefore a different position within image array 1300. That object, for example, may be contained within a patch at location 1314.

If the user further changes their view point to view point 1306, and the image sensor moves with the user, the location of the object, previously directly in front of the user, will be imaged at a different point within the field of view of an image sensor worn by the user and therefore a different position within image array 1300. That object, for example, may be contained within a patch at location 1316.

As can be seen, as the user changes their viewpoint further, the position of the patch in the image array needed to capture an object moves further. The trajectory of this motion, from location 1312, to location 1314 to location 1316 may be estimated and used for tracking a future position of a patch.

The trajectory may be estimated in other ways. For example, when a user has a view point 1302, a measurement with inertial sensors may indicate the acceleration and velocity of the user's head. This information may be used to predict the trajectory of the patch within the image array based on motion of the user's heard.

The patch trajectory estimation 906 may predict that the user will have a viewpoint 1304 at time t/and a viewpoint 1306 at time t2 based at least in part on these inertial measurements. Accordingly, the patch trajectory estimation 906 may predict the patch 1308 may move to patch 1310 at time t/and patch 1312 at time t2.

As an example of such an approach, it may be used to provide accurate and low latency estimations of head pose in an AR system. The patch may be positioned to encompass the image of a stationary object within a user's environment. As a specific example, processing of image information may identify a corner of a picture frame hanging on a wall as a recognizable and stationary object to track. That processing may center a patch on that object. As with the case of moving object 1202, described above in connection with FIG. 12, relative movement between the object and the user's head, will produce events that can be used to compute the relative motion between the user and the tracked object. In this example, because the tracked object is stationary, the relative motion is indicating motion of the imaging array, which is being worn by the user. That motion, therefore, indicates a change in the user's head pose relative to the physical world and can be used to maintain an accurate computation of the user's head pose, which may be used in rendering virtual objects realistically. As an imaging array as described herein can provide rapid updates, with relatively small amounts of data per update, computations to render virtual objects remain accurate (they can be performed quickly and updated frequently).

Referring back to FIG. 11, the patch trajectory estimation 906 may include adjusting (act 1106) a size of at least one of the patches based at least in part on the computed patch trajectories. For example, the size of the patch may be set to be large enough that it includes the pixels where an image of a movable object, or at least a portion of an object for which image information is to be generated, will be projected. The patch may be set to be slightly larger than the projected size of the image of the portion of the object of interest such that if there are any errors in estimating the trajectory of the patch, the patch may nonetheless include the relevant portions of the image. As an object moves relative to an image sensor, the size of the image of that object, in pixels, may change based on distance, incidence angle, orientation of the object or other factors. A processor defining the patch associated with an object may set a size of the patch, such as by measuring, based on other sensor data, or computing based on a world model, a size of a patch relevant for an object. Other parameters of the patch, such as its shape, similarly may be set or updated.

Figure 14:
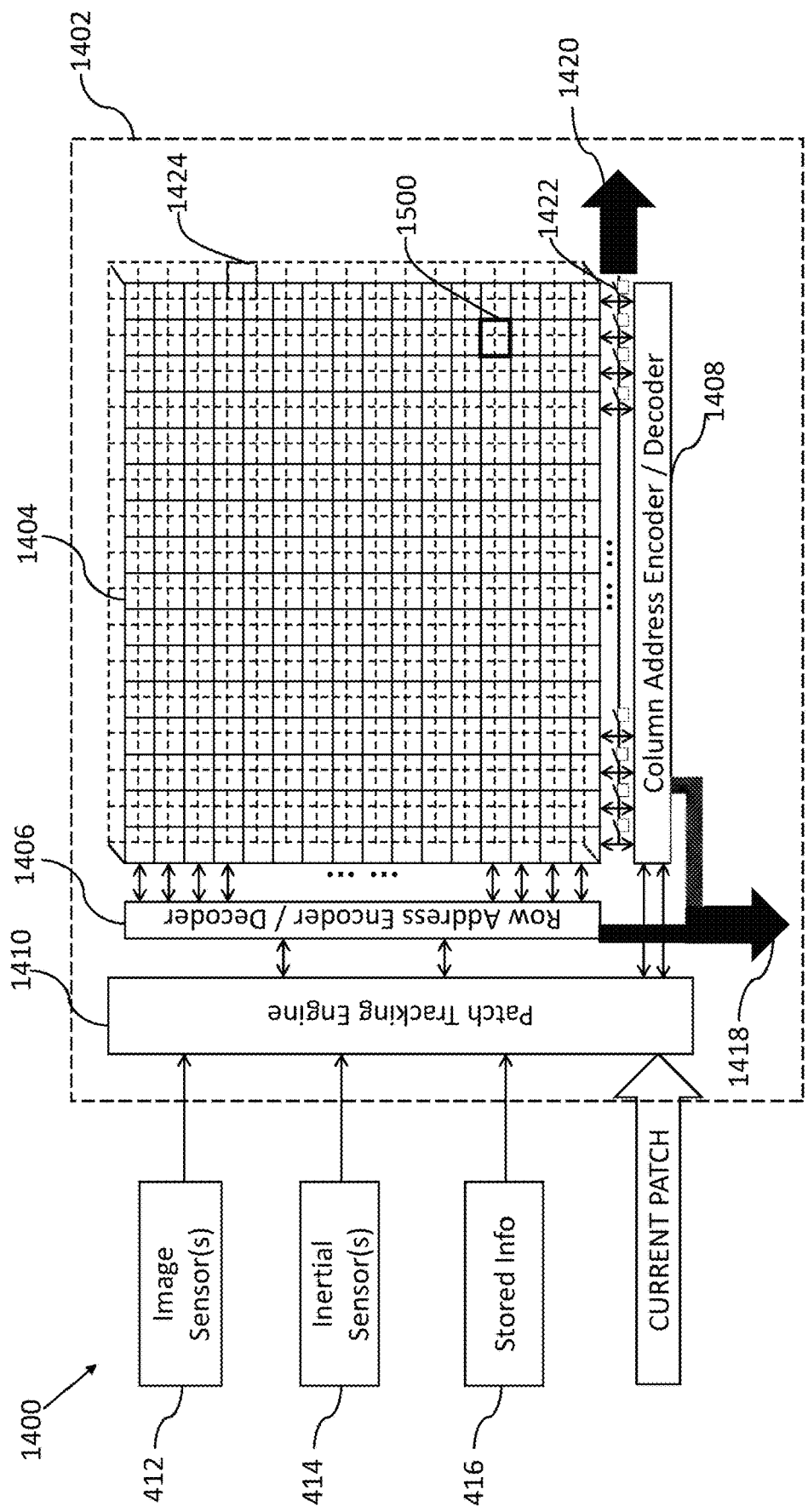
FIG. 14 is a schematic diagram illustrating an image sensing system, according to some embodiments.

FIG. 14 depicts an image sensing system 1400 that is configured for use in an XR system, according to some embodiments. Like image sensing system 400 (FIG. 4), image sensing system 1400 includes circuitry to selectively output values within a patch and may be configured to output events for pixels within a patch, also as described above. Additionally, image sensing system 1400 is configured to selectively output measured intensity values, which may be output for full image frames.

In the embodiment illustrated, separate outputs are shown for events, generated with DVS techniques as described above, and intensity values. Outputs generated with DVS techniques may be output as AER 1418, using representations as described above in connection with AER 418. Outputs representing intensity values may be output through an output, here designated as APS 1420. Those intensity outputs may be for a patch or may be for an entire image frame. The AER and APS outputs may be active at the same time. However, in the illustrated embodiment, image sensor 1400 operates, at any given time, in a mode to output events or a mode in which intensity information is output. A system, in which such an image sensor is used, may selectively use the event output and/or intensity information.

The image sensing system 1400 may include an image sensor 1402, which may include an image array 1404, which may contain multiple pixels 1500, each responsive to light. Sensor 1402 may further include circuitry to access the pixel cells. Sensor 1402 may further include circuitry that generates inputs to the access circuit to control the mode in which information is read out of pixel cells in image array 1404.

In the illustrated embodiment, image array 1404 is configured as an array with multiple rows and columns of pixel cells, which are accessible in both readout modes. In such an embodiment, the access circuit may include row address encoder/decoder 1406, column address encoder/decoder 1408 that controls column selection switches 1422, and/or registers 1424 that can temporarily hold information about incident light sensed by one or more corresponding pixel cells. The patch tracking engine 1410 may generate inputs to the access circuit to control which pixel cells are providing image information at any time.

In some embodiments, the image sensor 1402 may be configured to operate in a rolling shutter mode, a global shutter mode, or both. For example, the patch tracking engine 1410 may generate inputs to the access circuit to control the readout mode of image array 1402.

When the sensor 1402 operates a rolling shutter readout mode, a single column of pixel cells is selected during each system clock by, for example, closing a single column switch 1422 of the multiple column switches. During that system clock, the selected column of pixel cells is exposed and read out to APS 1420. To generate an image frame by the rolling shutter mode, the columns of pixel cells in the sensor 1402 may be read out one column by one column, and then processed by an image processor to generate the image frame.

When the sensor 1402 operates in a global shutter mode, the columns of pixel cells are exposed at the same time, for example, in a single system clock, and save information in registers 1424 such that the information captured by pixel cells in multiple columns can be read out to APS 1420b at the same time. Such readout mode allows direct output of image frames without the need of further data processing. In the illustrated example, the information about incident light sensed by a pixel cell is saved in a respective register 1424. It should be appreciated that multiple pixel cells may share one register 1424.

In some embodiments, the sensor 1402 may be implemented in a single integrated circuit, such as a CMOS integrated circuit. In some embodiments, the image array 1404 may be implemented in a single integrated circuit. The patch tracking engine 1410, row address encoder/decoder 1406, column address encoder/decoder 1408, column selection switches 1422, and/or registers 1424 may be implemented in a second single integrated circuit, configured as, for example, a driver for the image array 1404. Alternatively or additionally, some or all of the functions of the patch tracking engine 1410, row address encoder/decoder 1406, column address encoder/decoder 1408, column selection switches 1422, and/or registers 1424 may be distributed to other digital processors within the AR system.

Figure 15:
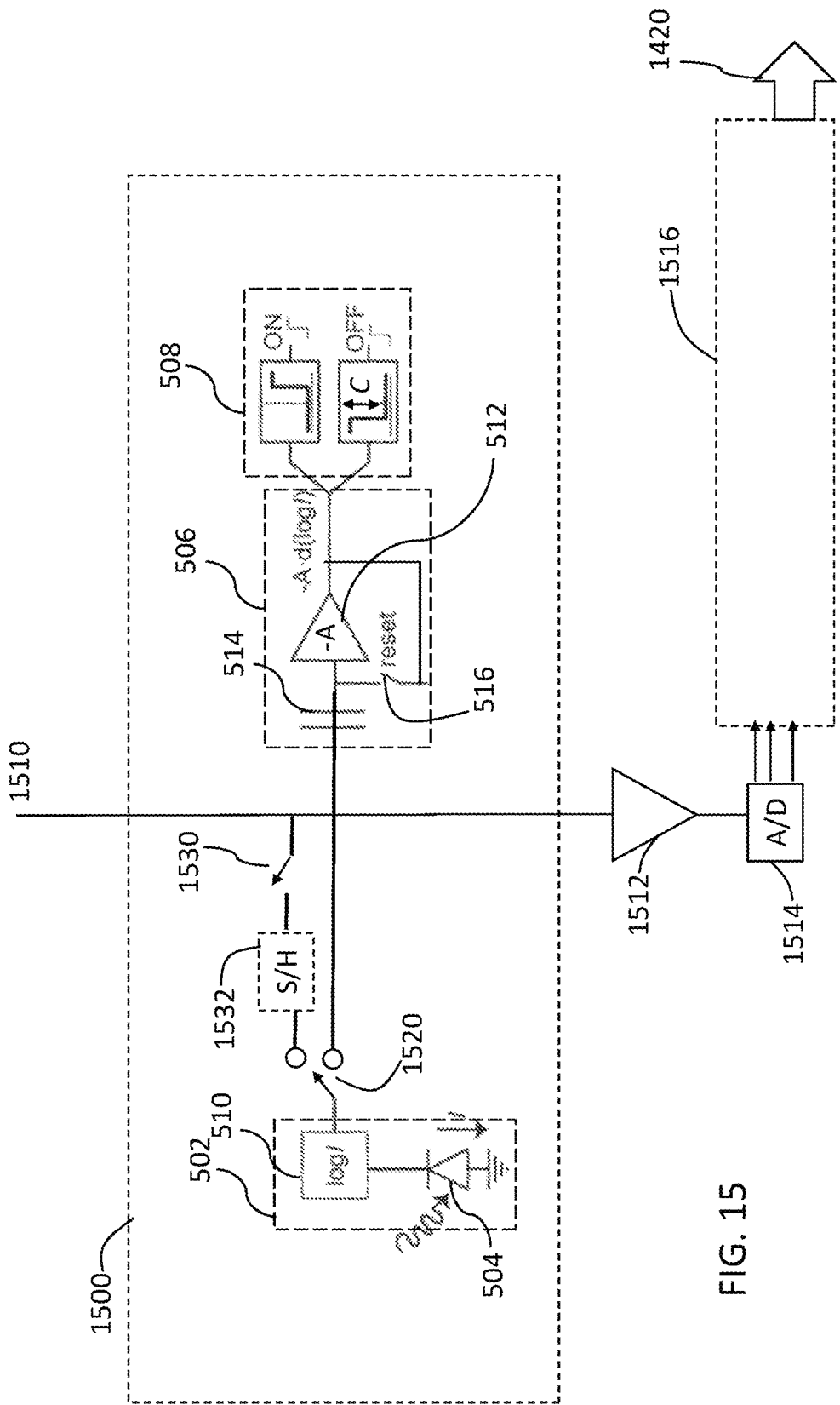
FIG. 15 is a schematic diagram illustrating a pixel cell in FIG. 14, according to some embodiments.

FIG. 15 illustrates an exemplary pixel cell 1500. In the illustrated embodiment, each pixel cell may be set to output either events or intensity information. However, it should be appreciated that, in some embodiments, an image sensor may be configured to output both types of information concurrently.

Both event information and intensity information is based on an output of a photodetector 504, as described above in connection with FIG. 5. Pixel cell 1500 includes circuitry to generate event information. That circuitry includes a photoreceptor circuit 502, a differencing circuit 506, and a comparator 508, also as described above. Switch 1520 connects photodetector 504 to the event generation circuit when in a first state. Switch 1520, or other control circuitry, may be controlled by a processor controlling an AR system so that a relatively small amount of image information is provided during substantial periods of time when the AR system is in operation.

Switch 1520, or other control circuitry, may also be controlled to configure pixel cell 1500 to output intensity information. In the illustrated information, intensity information is provided as a full image frame, represented as a stream of pixel intensity values for each pixel in the image array successively. To operate in this mode, switch 1520 in each pixel cell may be set in a second position, which exposes the output of photodetector 504, after passing through amplifier 510, so that it may be connected to an output line.

In the illustrated embodiment, the output line is illustrated as column line 1510. There may be one such column line for each column in an image array. Each pixel cell in a column may be coupled to column line 1510, but the pixel array may be controlled such that one pixel cell is coupled to column line 1510 at a time. Switch 1530, of which there is one such switch in each pixel cell, controls when pixel cell 1500 is connected to its respective column line 1510. Access circuit, such as row address decoder 410, may close switch 1530 to ensure that only one pixel cell is connected to each column line at a time. Switches 1520 and 1530 may be implemented using one or more transistors that are part of the image array or similar components.

FIG. 15 shows a further component that may be included in each pixel cell in accordance with some embodiments. Sample and hold circuit (S/H) 1532 may be connected between photodetector 504 and column line 1510. When present S/H 1532 may enable image sensor 1402 to operate in a global shutter mode. In a global shutter mode, a trigger signal is concurrently sent to each pixel cell in an array. Within each pixel cell, S/H 1532 captures a value indicating the intensity, at the time of the trigger signal. S/H 1532 stores that value, and generates an output based on that value, until the next value is captured.

As shown in FIG. 15, a signal representing the value stored by S/H 1532 may be coupled to column line 1510 when switch 1530 is closed. The signal coupled to column line may be processed to produce an output of the image array. That signal, for example, may be buffered and/or amplified in amplifier 1512 at the end of column line 1510 and then applied to an analog to digital converter (A/D) 1514. The output of A/D 1514 may be passed through other readout circuit 1516 to output 1420. Readout circuit 1516 may include, for example, column switches 1422. Other components within readout circuit 1516 may perform other functions, such as to serialize a multibit output of A/D 1514.

A person of skill in art would understand how to implement circuits to perform the functions described herein. S/H 1532 may be implemented, for example, as one or more capacitors and one or more switches. However, it should be appreciated that S/H 1532 may be implemented using other components or in other circuit configurations than illustrated in FIG. 15A. It should be appreciated that other components also may be implemented other than as illustrated. For example, FIG. 15 indicates one amplifier and one A/D converter per column. In other embodiments, there may be one A/D converter shared across multiple columns.

In a pixel array configured for global shutter, each S/H 1532 may store an intensity value reflecting image information at the same instant in time. These values may be stored during a readout phase as the values stored in each pixel are successively read out. Successive readout may be achieved, for example, by connecting S/H 1532 of each pixel cell in a row to its respective column line. The values on the column lines may then be passed to APS output 1420 one at a time. Such a flow of information may be controlled by sequencing the opening and closing of column switches 1422. That operation may be controlled by column address decoder 1408, for example. Once the values for each of the pixels of one row are read out, pixel cells in the next row may be connected to the column lines in their place. Those values may be read out, one column at a time. The process of reading out values for one row at a time may be repeated until intensity values for all pixels in the image array are read out. In embodiments in which intensity values are read out for one or more patches, the process will be complete when values for pixel cells within the patch are read out.

The pixel cells may be read out in any suitable order. The rows, for example, may be interleaved, such that every second row is read out in sequence. The AR system may nonetheless process the image data as a frame of image data by de-interleaving the data.

In embodiments in which S/H 1532 is not present, the values may still be read from each pixel cell sequentially, as rows and columns of values are scanned out. The value read from each pixel cell, however, may represent the intensity of light detected at a photodetector of a cell at the time the value in that cell is captured as part of the readout process, such as when that value is applied to A/D 1514, for example. As a result, in a rolling shutter, the pixels of an image frame may represent the image incident on the image array at slightly different times. For an image sensor that outputs a full frame at a 30 Hz rate, the difference in time between when the first pixel value for a frame is captured and the last pixel value for a frame may differ by $1/30^{th}$ of a second, which for many applications is imperceptible.

For some XR functions, such as tracking an object, the XR system may perform computations on image information collected with an image sensor using a rolling shutter. Such computations may interpolate between successive image frames to compute, for each pixel, an interpolated value representing an estimated value of the pixel at a point in time between the successive frames. The same time may be used for all pixels, such that, via computation the interpolated image frame contains pixels representing the same point in time, such as might be produced with an image sensor having a global shutter. Alternatively, a global shutter image array may be used for one or more image sensors in a wearable device forming a portion of an XR system. A global shutter for a full or partial image frame may avoid interpolation of other processing that might be performed to compensate for variations in capture time in image information captured with a rolling shutter. Interpolation computation may therefore be avoided, even if the image information is used to track motion of an object, such as may occur for processing to track a hand or other movable object or to determine head pose of a user of a wearable device in an AR system or even to construct an accurate representation of a physical environment using a camera on a wearable device, which might be moving as image information is collected.

Differentiated Pixel Cells

In some embodiments, each of the pixel cells in a sensor array may be the same. Each pixel cell, for example, may respond to a broad spectrum of visible light. Each photodetector, therefore may provide image information indicating intensity of visible light. In this scenario, the output of the image array may be a "grayscale" output, indicating the amount of visible light incident on the image array.

In other embodiments the pixel cells may be differentiated. For example, different pixel cells in the sensor array may output image information indicating intensity of light in a particular portion of the spectrum. A suitable technique for differentiating pixel cells is to position filter elements in the light path leading to photodetectors in the pixel cells. The filter elements may be bandpass, for example, allowing visible light of a particular color to pass. Applying such a color filter over a pixel cell configures that pixel cell to provide image information indicating the intensity of light of the color corresponding to the filter.

Filters may be applied over pixel cells regardless of the structure of the pixel cell. They may be applied, for example, over pixel cells in a sensor array with a global shutter or a rolling shutter. Likewise, filters may be applied to pixel cells configured to output intensity or changes of intensity using DVS techniques.

In some embodiments, a filter element that selectively passes light of a primary color may be mounted over the photodetector in each pixel cell in a sensor array. For example, filters that selectively pass red, green or blue light may be used. The sensor array may have multiple subarrays, with each subarray having one or more pixels configured to sense light of each of the primary colors. In this way, the pixel cells in each subarray provide both intensity and color information about objects being imaged by the image sensor.

The inventors have recognized and appreciated that in an XR system, some functions require color information, while some functions can be performed with gray scale information. A wearable device equipped with image sensors to provide image information for operation of an XR system may have multiple cameras, some of which may be formed with image sensors that can provide color information. Others of the cameras may be grayscale cameras. The inventors have recognized and appreciated that grayscale cameras may consume less power, be more sensitive in low light conditions, output data faster and/or output less data to represent the same extent of the physical world with the same resolution as a camera formed with a comparable image sensor configured to sense color. Yet, grayscale cameras may output image information sufficient for many functions performed in an XR system. Accordingly, an XR system may be configured with both grayscale and color cameras, using primarily a grayscale camera or cameras and selectively using the color camera.

For example, an AR system may collect and process image information to create a passable world model. That processing may use color information, which may enhance the effectiveness of some functions, such as differentiating objects, identifying surfaces associated with the same object and/or recognizing objects. Such processing may be performed or updated from time to time, for example when a user first turns on the system, moves to a new environment, such as by walking into another room, or a change in the user's environment is otherwise detected.

Other functions are not significantly improved through the use of color information. For example, once a passable world model is created, the AR system may use images from one or more cameras to determine the orientation of the wearable device relative to features in the passable world model. Such a function may be done, for example, as part of head pose tracking. Some or all of the cameras used for such functions may be grayscale. As head pose tracking is performed frequently as the AR system operates, continuously in some embodiments, using one or more grayscale cameras for this function may provide an appreciable power savings, reduced compute, or other benefits.

Similarly, at multiple times during the operation of an AR system, the system may use stereoscopic information from two or more cameras to determine the distance to a movable object. Such a function may require processing image information at a high rate as part of tracking a user's hand or other movable object. Using one or more grayscale cameras for this function may provide lower latency associated with processing high resolution image information, or other benefits.

In some embodiments of an AR system, the AR system may have both a color and at least one gray scale camera and may selectively enable grayscale and/or color cameras based on the function for which image information from those cameras is to be used.

Pixel cells in an image sensor may be differentiated in ways other than based on spectrum of light to which the pixel cells are sensitive. In some embodiments, some or all of the pixel cells may produce an output having an intensity indicative of the angle-of-arrival of light incident on the pixel cell. Angle of arrival information may be processed to compute a distance to an object being imaged.

In such embodiments, an image sensor may passively acquire depth information. Passive depth information may be obtained by placing a component in the light path to a pixel cell in the array, such that the pixel cell outputs information indicative of the angle-of-arrival of light striking that pixel cell. An example of such component is a transmissive diffraction mask (TDM) filter.

The angle-of-arrival information may, through calculation, be converted into distance information, indicating distance to an object from which light is being reflected. In some embodiments, pixel cells configured to provide angle-of-arrival information may be interspersed with pixel cells capturing light intensity of one or more colors. As a result, the angle of arrival information, and therefore distance information, may be combined with other image information about an object.

In some embodiments, one or more of the sensors may be configured to acquire information about physical objects in a scene at a high frequency with low latency using compact and low power components. The image sensor, for example, may draw less than 50 mWattts, enabling the device to be powered with a battery that is small enough to be used as part of a wearable system. That sensor may be an image sensor configured to passively acquire depth information, instead of or in addition to, image information that indicates intensity of information of one or more colors and/or change of intensity information. Such a sensor may also be configured to provide a small amount of data by using patch tracking or by using DVS techniques to provide a differential output.

Passive depth information may be obtained by configuring an image array, such as an image array incorporating any one or more of the techniques described herein, with components that adapt one or more of the pixel cells in the array to output information indicative of a light field emanating from objects being imaged. That information may be based on the angle of arrival of light striking that pixel. In some embodiments, pixel cells, such as those described above, may be configured to output an indication of angle of arrival by placing a plenoptic component in the light path to the pixel cell. An example of a plenoptic component is a transmissive diffraction mask (TDM). The angle of arrival information may, through calculation, be converted into distance information, indicating distance to an object from which light is being reflected to form an image being captured. In some embodiments, pixel cells configured to provide angle of arrival information may be interspersed with pixel cells capturing light intensity on a gray scale or of one or more colors. As a result, the angle of arrival information may also be combined with other image information about an object.

Figure 16:
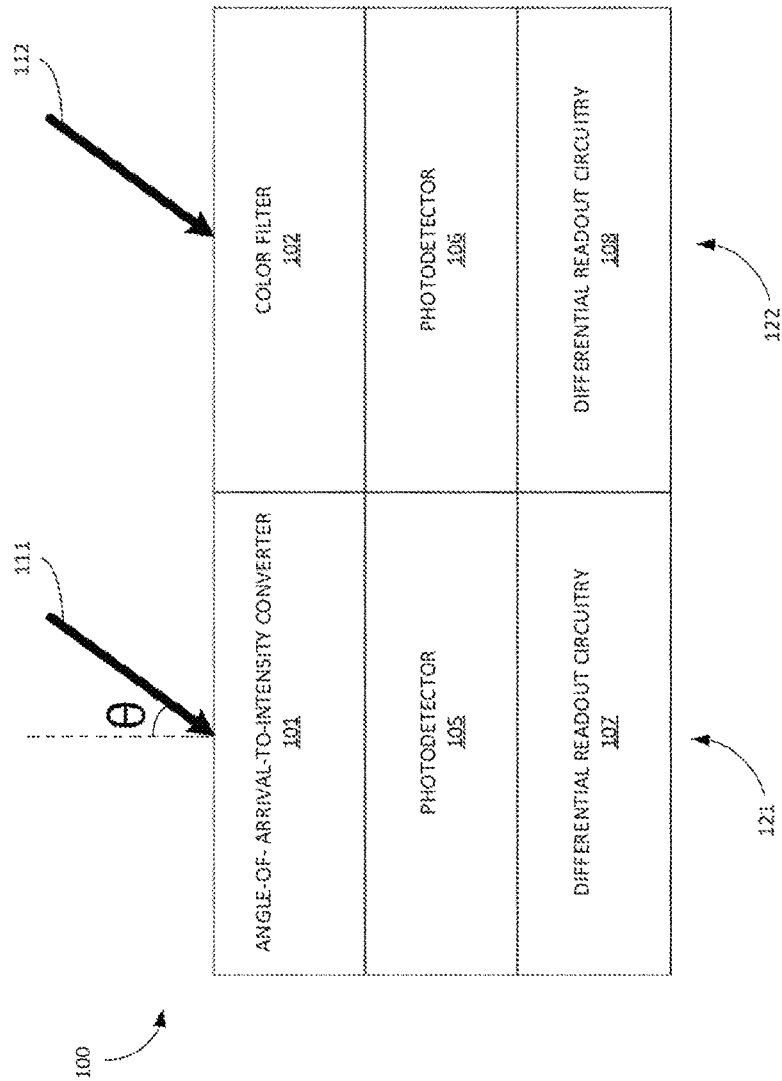
FIG. 16 is a schematic diagram of a pixel subarray, according to some embodiments.

FIG. 16 illustrates a pixel subarray 100 according to some embodiments. In the illustrated embodiment, the subarray has two pixel cells, but the number of pixel cells in a subarray is not a limitation on the invention. Here, a first pixel cell 121 and a second pixel cell 122 are shown, one of which is configured to capture angle of arrival information (first pixel cell 121), but it should be appreciated that the number and locations within an array of pixel cells configured to measure angle of arrival information may be varied. In this example, the other pixel cell (second pixel cell 122) is configured to measure the intensity of one color of light, but other configurations are possible, including pixel cells sensitive to different colors of light or one or more pixel cells sensitive to a broad spectrum of light, such as in a gray scale camera.

The first pixel cell 121 of the pixel subarray 100 of FIG. 16 includes an angle-of-arrival to-intensity converter 101, a photodetector 105, and differential readout circuit 107. The second pixel cell 122 of the pixel subarray 100 includes a color filter 102, a photodetector 106, and differential readout circuit 108. It should be appreciated that not all of the components illustrated in FIG. 16 need be included in every embodiment. For example, some embodiments may not include differential readout circuit 107 and/or 108 and some embodiments may not include the color filter 102. Furthermore, additional components may be included that are not shown in FIG. 16. For example, some embodiments may include a polarizer arranged to allow light of a particular polarization to reach the photodetector. As another example, some embodiments may include scan-out circuit instead of or in addition differential readout circuit 107. As another example, the first pixel cell 121 may also include a color filter such that the first pixel 121 measures both angle of arrival and the intensity of a particular color of light incident upon the first pixel 121.

The angle-of-arrival to-intensity converter 101 of the first pixel 121 is an optical component that converts the angle θ of incident light 111 into an intensity that can be measured by a photodetector. In some embodiments, the angle-of-arrival to-intensity converter 101 may include refractive optics. For example, one or more lenses may be used to convert an incident angle of light into a position on an image plane, the amount of that incident light detected by one or more pixel cells. In some embodiments, the angle-of-arrival to-position intensity converter 101 may include diffractive optics. For example, one or more diffraction gratings (e.g., a transmissive diffraction mask (TDM)) may convert an incident angle of light into an intensity that may be measured by a photodetector below the TDM.

The photodetector 105 of the first pixel cell 121 receives incident light 110 that passes through the angle-of-arrival to-intensity converter 101 and generates an electric signal based on the intensity of the light incident upon the photodetector 105. The photodetector 105 is located at the image plane associated with the angle-of-arrival to-intensity converter 101. In some embodiments, the photodetector 105 may be a single pixel of an image sensor, such as a CMOS image sensor.

The differential readout circuit 107 of the first pixel 121 receives the signal from the photodetector 105 and outputs an event only when an amplitude of the electric signal from the photodetector is different from an amplitude of a previous signal from the photodetector 105, implementing a DVS technique as described above.

The second pixel cell 122 includes color filter 102 for filtering incident light 112 such that only light within a particular range of wavelengths passes through the color filter 102 and is incident upon a photodetector 106. The color filter 102, for example may be a bandpass filter that allows one of red, green, or blue light through and rejects light of other wavelengths and/or may limit IR light reaching photodetector 106 to only a particular portion of the spectrum.

In this example, the second pixel cell 122 also includes the photodetector 106 and the differential readout circuit 108, which may act similarly as the photodetector 105 and the differential readout circuit 107 of the first pixel cell 121.

As mentioned above, in some embodiments, an image sensor may include an array of pixels, each pixel associated with a photodetector and a readout circuit. A subset of the pixels may be associated with an angle-of-arrival to-intensity converter that is used for determining the angle of detected light incident on the pixel. Other subsets of the pixels may be associated with color filters used for determining color information about the scene being observed or may selectively pass or block light based on other characteristics.

In some embodiments, the angle of arrival of light may be determined using a single photodetector and diffraction gratings at two different depths. For example, light may be incident upon a first TDM, converting the angle of arrival to a position, and a second TDM may be used to selectively pass light incident at a particular angle. Such arrangements may utilize the Talbot effect, which is a near-field diffraction effect wherein an image of a diffraction grating is created a certain distance from the diffraction grating when a plane wave is incident upon the diffraction grating. If a second diffraction grating is placed at an image plane, where the image of the first diffraction grating is formed, then an angle of arrival may be determined from the intensity of light measured by a single photodetector positioned after the second grating.

Figure 17A:
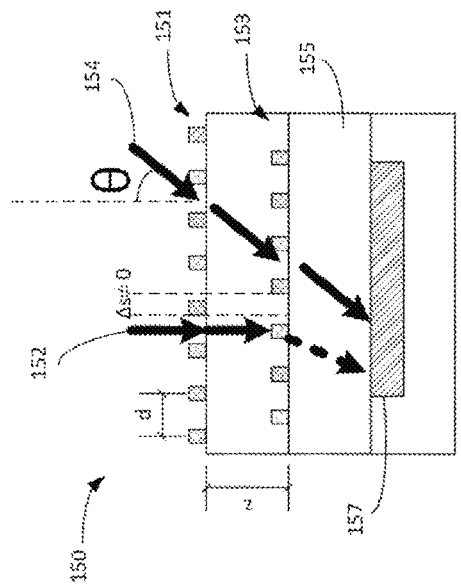
FIG. 17A is a cross-section view of a plenoptic device with an angle-of-arrival to-intensity converter in the form of two stacked transmissive diffraction mask (TDMs) that are aligned, according to some embodiments.

FIG. 17A illustrates a first arrangement of a pixel cell 140 that includes a first TDM 141 and a second TDM 143 that are aligned with one another such that the ridges and/or regions of increased index of refraction for the two gratings are aligned in the horizontal direction (Δs=0), where Δs is the horizontal offset between the first TDM 141 and the second TDM 143. Both the first TDM 141 and the second TDM 143 may have the same grating period d, and the two gratings may be separated by a distance/depth z. The depth z, known as the Talbot length, at which the second TDM 143 is located relative to the first TDM 141 may be determined by the grating period d and the wavelength λ of the light being analyzed and is given by the expression:

$$z = \frac{\lambda}{1 - \sqrt{1 - \lambda^2/a^2}}$$

As illustrated in FIG. 17A, incident light 142 with an angle of arrival of zero degrees is diffracted by the first TDM 141. The second TDM 143 is located at a depth equal to the Talbot length such that an image of the first TDM 141 is created, resulting in most of the incident light 142 passing through the second TDM 143. An optional dielectric layer 145 may separate second TDM 143 from photodetector 147. As light passes through dielectric layer 145, photodetector 147 detects the light and generates an electrical signal with a property (e.g., voltage or current) proportional to the intensity of the light incident upon the photodetector. On the other hand, while incident light 144 with a non-zero angle of arrival θ is also diffracted by the first TDM 141, the second TDM 143 prevents at least a portion of the incident light 144 from reaching the photodetector 147. The amount of incident light reaching photodetector 147 depends on the angle of arrival θ, with less light reaching the photodetector at larger angles. The dashed line resulting from the light 144 illustrates that the amount of light that reaches the photodetector 147 is attenuated. In some cases, the light 144 may be completely blocked by the diffraction grating 143. Thus, information about the angle of arrival of incident light may be obtained using the single photodetector 147 using two TDMs.

In some embodiments, information obtained by adjacent pixel cells with no angle-of-arrival to-intensity converters may provide an indication of the intensity of the incident light and may be used to determine the portion of the incident light passing through the angle-of-arrival to-intensity converter. From this image information, angle of arrival of the light detected by the photodetector 147 may be computed, as described in more detail below.

Figure 17B:
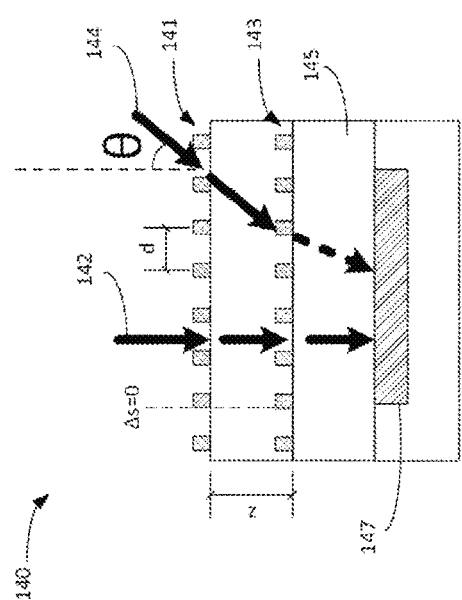
FIG. 17B is a cross-section view of a plenoptic device with an angle-of-arrival to-intensity converter in the form of two stacked TDMs that are not aligned, according to some embodiments.

FIG. 17B illustrates a second arrangement of a pixel cell 150 that includes a first TDM 151 and a second TDM 153 that are misaligned with one another such that the ridges and/or regions of increased index of refraction for the two gratings are not aligned in the horizontal direction (Δs≠0), where Δs is the horizontal offset between the first TDM 151 and the second TDM 153. Both the first TDM 151 and the second TDM 153 may have the same grating period d, and the two gratings may be separated by a distance/depth z. Unlike the situation discussed in connection with FIG. 17A, where the two TDMs are aligned, the misalignment results in incident light of an angle different from zero passing through the second TDM 153.

As illustrated in FIG. 17B, incident light 152 with an angle of arrival of zero degrees is diffracted by the first TDM 151. The second TDM 153 is located at a depth equal to the Talbot length, but due to the horizontal offset of the two gratings, at least a portion of the light 152 is blocked by the second TDM 153. The dashed line resulting from the light 152 illustrates that the amount of light that reaches the photodetector 157 is attenuated. In some cases, the light 152 may be completely blocked by the diffraction grating 153. On the other hand, incident light 154 with a non-zero angle of arrival θ is diffracted by the first TDM 151, but passes through the second TDM 153. After traversing an optional dielectric layer 155, a photodetector 157 detects the light incident upon the photodetector 157 and generates an electrical signal with a property (e.g., voltage or current) proportional to the intensity of the light incident upon the photodetector.

Pixel cells 140 and 150 have different output functions, with different intensity of light detected for different incident angles. In each case, however, the relationship is fixed and may be determined based on the design of the pixel cell or by measurements as part of a calibration process. Regardless of the precise transfer function, the measured intensity may be converted to an angle of arrival, which in turn may be used to determine distance to an object being imaged.

In some embodiments, different pixel cells of the image sensor may have different arrangements of TDMs. For example, a first subset of pixel cells may include a first horizontal offset between the gratings of the two TDMs associated with each pixel while a second subset of pixel cells may include a second horizontal offset between the gratings of the two TDMs associated with each pixel cell, where the first offset is different from the second offset. Each subset of pixel cells with a different offset may be used to measure a different angle of arrival or a different range of angles of arrival. For example, a first subset of pixels may include an arrangement of TDMs similar to the pixel cell 140 of FIG. 17A and a second subset of pixels may include an arrangement of TDMs similar to the pixel cell 150 of FIG. 17B.

In some embodiments, not all pixel cells of an image sensor include TDMs. For example, a subset of the pixel cells may include color filters while a different subset of pixel cells may include TDMs for determining angle of arrival information. In other embodiments, no color filters are used such that a first subset of pixel cells simply measures the overall intensity of the incident light and a second subset of pixel cells measures the angle of arrival information. In some embodiments, information regarding the intensity of light from nearby pixel cells with no TDMs may be used to determine the angle of arrival for light incident upon the pixel cells with one or more TDMs. For example, using two TDMs arranged to take advantage of the Talbot effect, the intensity of light incident on a photodetector after the second TDM is a sinusoidal function of the angle of arrival of the light incident upon the first TDM. Accordingly, if the total intensity of the light incident upon the first TDM is known, then the angle of arrival of the light may be determined from the intensity of the light detected by the photodetector.

In some embodiments, the configuration of pixel cells in a subarray may be selected to provide various types of image information with appropriate resolution. FIGS. 18A-C illustrate example arrangements of pixel cells in a pixel subarray of an image sensor. The illustrated examples are non-limiting, as it should be understood that alternative pixel arrangements are contemplated by the inventors. This arrangement may be repeated across the image array, which may contain millions of pixels. A subarray may include one or more pixel cells that provide angle-of-arrival information about incident light and one or more other pixel cells that provide intensity information about incident light (with or without a color filter).

FIG. 18A is an example of a pixel subarray 160 including a first set of pixel cells 161 and a second set of pixel cells 163 that are different from one another and rectangular, rather than square. Pixel cells labeled "R" are pixel cells with a red filters such that red incident light passes through the filter to the associated photodetector; pixel cells labeled "B" are pixel cells with a blue filters such that blue incident light passes through the filter to the associated photodetector; and pixel cells labeled "G" are pixels with a green filter such that green incident light passes through the filter to the associated photodetector. In the example subarray 160 there are more green pixel cells than red or blue pixel cells, illustrating that the various types of pixel cells need not be present in the same proportion.

Pixel cells labeled A1 and A2 are pixels that provide angle-of arrival information. For example, pixel cells A1 and A2 may include one or more gratings for determining angle of arrival information. The pixel cells that provide angle-of-arrival information may be configured similarly or may be configured differently, such as to be sensitive to different ranges of angles of arrival or to angle of arrival with respect to a different axis. In some embodiments, the pixels labeled A1 and A2 include two TDMs, and the TDMs of pixel cells A1 and A2 may be oriented in different directions, for example, perpendicular to one another. In other embodiments, the TDMs of pixel cells A1 and A2 may be oriented parallel to one another.

In embodiments that use pixel subarray 160, both color image data and angle of arrival information may be obtained. To determine the angle of arrival of light incident upon the set of pixel cells 161, the total light intensity incident on the set 161 is estimated using the electrical signals from the RGB pixel cells. Using the fact that the intensity of light detected by the A1/A2 pixels varies in a predictable way as a function of the angle of arrival, the angle of arrival may be determined by comparing the total intensity (estimated from the RGB pixel cells within the group of pixels) to the intensity measured by the A1 and/or A2 pixel cells. For example, the intensity of the light incident on the A1 and/or A2 pixels may vary sinusoidally with respect to angle of arrival of the incident light. The angle of arrival of light incident upon the set of pixel cells 163 is determined in a similar way using the electrical signals generated by the pixels of set 163.

It should be appreciated that FIG. 18A shows a specific embodiment of a subarray, and other configurations are possible. In some embodiments, for example, the subarray may be only the set of pixel cells 161 or 163.

FIG. 18B is an alternative pixel subarray 170 including a first set of pixel cells 171, a second set of pixel cells 172, a third set of pixel cells 173, and a fourth set of pixel cells 174. Each set of pixel cells 171-174 is square and has the same arrangement of pixel cells within, but for the possibility of having pixel cells for determining angle of arrival information over different ranges of angles or with respect to different planes (e.g., the TDMs of pixels A1 and A2 may be oriented perpendicular to one another). Each set of pixels 171-174 includes one red pixel cell (R), one blue pixel cell (B), one green pixel cell (G), and one angle of arrival pixel cell (A1 or A2). Note that in the example pixel subarray 170 there are an equal number of red/green/blue pixel cells in each set. Further, it should be understood that the pixel subarray may be repeated in one or more directions to form a larger array of pixels.

In embodiments that use pixel subarray 170, both color image data and angle of arrival information may be obtained. To determine the angle of arrival of light incident upon the set of pixel cells 171, the total light intensity incident on the set 171 may be estimated using the signals from the RGB pixel cells. Using the fact that the intensity of light detected by the angle-of-arrival pixel cells has a sinusoidal or other predictable response with respect to angle of arrival, the angle of arrival may be determined by comparing the total intensity (estimated from the RGB pixel cells) to the intensity measured by the A1 pixels. The angle of arrival of light incident upon the sets of pixel cells 172-174 may be determined in a similar way using the electrical signals generated by the pixel cells of each respective set of pixels.

FIG. 18C is an alternative pixel subarray 180 including a first set of pixel cells 181, a second set of pixel cells 182, a third set of pixel cells 183, and a fourth set of pixel cells 184. Each set of pixel cells 181-184 is square and has the same arrangement of pixel cells within where no color filters are used. Each set of pixel cells 181-184 includes two "white" pixels (e.g., no color filter such that red, blue, and green light is detected to form a greyscale image) one angle of arrival pixel cell (A1) with TDMs oriented in a first direction, and one angle of arrival pixel cell (A2) with TDMs oriented with a second spacing or in a second direction (e.g. perpendicular) relative to the first direction. Note that in the example pixel subarray 170 there is no color information. The resulting image is greyscale, illustrating that passive depth information may be acquired using techniques as described herein in color or grayscale image arrays. As with other subarray configurations described herein, the pixel subarray arrangement may be repeated in one or more directions to form a larger array of pixels.

In embodiments that use pixel subarray 180, both greyscale image data and angle of arrival information may be obtained. To determine the angle of arrival of light incident upon the set of pixel cells 181, the total light intensity incident on the set 181 is estimated using the electrical signals from the two white pixels. Using the fact that the intensities of light detected by the A1 and A2 pixels have a sinusoidal or other predictable response with respect to angle of arrival, the angle of arrival may be determined by comparing the total intensity (estimated from the white pixels) to the intensity measured by the A1 and/or A2 pixel cells. The angle of arrival of light incident upon the sets of pixel cells 182-184 may be determined in a similar way using the electrical signals generated by the pixels of each respective set of pixels.

In the above examples, the pixel cells have been illustrated as square and are arranged in square grid. Embodiments are not so limited. For example, in some embodiments, the pixel cells may be rectangular in shape. Moreover, the subarrays may be triangular or arranged on a diagonal or have other geometries.

In some embodiments, the angle of arrival information is obtained using the image processor 708 or a processor associated with the local data processing module 70, which may further determine a distance of an object based on the angle of arrival. For example, the angle of arrival information may be combined with one or more other types of information to obtain a distance of an object. In some embodiments, an object of the mesh model 46 may be associated with the angle of arrival information from the pixel array. The mesh model 46 may include a location of the object, including a distance from the user, which may be updated to a new distance value based on the angle of arrival information.

Using the angle of arrival information to determine distance values may be particularly useful in scenarios where an object is close to the user. This is because changes in a distance from the image sensor result in larger changes in the angle of arrival of light for nearby objects than distance changes of similar magnitude for objects that are positioned far from the user. Accordingly, a processing module making use of passive distance information based on angle of arrival may selectively use that information based on an estimated distance of an object, and may make use of one or more other techniques to determine distance to objects that are beyond a threshold distance, such as up to 1 meter, up to 3 meters or up to five meters, in some embodiments. As a specific example, the processing module of an AR system may be programmed to use passive distance measurements using angle of arrival information for objects within 3 meters of the user of a wearable device, but may use stereoscopic image processing, using images captured by two cameras, for objects outside that range.

Similarly, pixels configured to detect angle of arrival information may be most sensitive to changes in distance within a range of angles from a normal to an image array. A processing module may similarly be configured to use distance information derived from angle of arrival measurements within that range of angles, but use other sensors and/or other techniques for determining distance outside that range.

One example application of determining the distance of an object from the image sensor is hand tracking. Hand tracking may be used in an AR system, for example, to provide a gesture-based user interface for the system 80 and/or for allowing the user to move virtual objects within the environment in an AR experience provided by the system 80. The combination of an image sensor that provides angle of arrival information for accurate depth determination with differential readout circuit for reducing the amount of data to process for determining the motion of the user's hands provides an efficient interface by which the user can interact with virtual objects and/or provide input to the system 80. A processing module determining the location of a user's hand may use distance information, acquired using different techniques, depending on the location of the user's hand in the field of view of the image sensors of a wearable device. Hand tracking may be implemented as a form of patch tracking during an image sensing process, according to some embodiments.

Another application where the depth information may be useful is in occlusion processing. Occlusion processing uses depth information to determine that certain portions of a model of the physical world need not or cannot be updated based on image information being captured by one or more image sensors collecting image information about a physical environment around a user. For example, if it is determined that there is a first object a first distance from the sensor, then the system 80 may determine not to update the model of the physical world for distances greater than the first distance. Even if, for example, the model includes a second object a second distance from the sensor, the second distance being greater than the first distance, the model information for that object may not be updated if it is behind the first object. In some embodiments, the system 80 may generate an occlusion mask based on the location of the first object and only update portions of the model not masked by the occlusion mask. In some embodiments, the system 80 may generate more than one occlusion mask for more than one object. Each occlusion mask may be associated with respective distance from the sensor. For each occlusion mask, model information associated with objects that are a distance from the sensor greater than the distance associated with a respective occlusion mask will not be updated. By limiting the portions of the model that is updated at any given time, the speed of generating the AR environment and the amount of computational resources needed to generate the AR environment is reduced.

While not shown in FIGS. 18A-C, some embodiments of an image sensor may include pixels with an IR filter in addition to or instead of color filters. For example, the IR filter may allow light of a wavelength, such as approximately equal to 940 nm, to pass and be detected by an associated photodetector. Some embodiments of a wearable may include an IR light source (e.g., an IR LED) that emits light of the same wavelength as is associated with the IR filter (e.g., 940 nm). The IR light source and IR pixels may be used as an alternative way of determining the distance of objects from the sensor. By way of example and not limitation, the IR light source may be pulsed and time of flight measurements may be used to determine the distance of objects from the sensor.

In some embodiments, the system 80 may be capable of operating in one or more modes of operation. A first mode may be a mode where depth determinations are made using passive depth measurements, for example, based on the angle of arrival of light determined using pixels with angle-of-arrival to-intensity converters. A second mode may be a mode where depth determinations are made using active depth measurements, for example, based on the time of flight of IR light measured using IR pixels of the image sensor. A third mode may be using the stereoscopic measurements from two separate image sensors to determine the distance of an object. Such stereoscopic measurements may be more accurate than using the angle of arrival of light determined using pixels with angle-of-arrival to-intensity converters when the object is very far from the sensor. Other suitable methods of determining depth may be used for one or more additional modes of operation for depth determination.

In some embodiments, it may be preferable to use passive depth determination because such techniques utilize less power. However, the system may determine that it should operate in an active mode under certain conditions. For example, if the intensity of visible light being detected by the sensor is below a threshold value, it may be too dark to accurately perform passive depth determination. As another example, objects may be too far away for passive depth determination to be accurate. Thus, the system may be programmed to select to operate in a third mode where depth is determined based on the stereoscopic measurement of a scene using two spatially separated image sensors. As another example, determining the depth of an object based on an angle of arrival of light determined using pixels with angle-of-arrival to-intensity converters may be inaccurate in the periphery of the image sensor. Accordingly, if the object is being detected by pixels near the periphery of the image sensor, the system may select to operate in the second mode, using active depth determination.

While embodiments of the image sensor described above used individual pixel cells with stacked TDMs to determine the angle of arrival of light incident upon the pixel cell, other embodiments may use groups of multiple pixel cells with a single TDM over all the pixels of the group to determine angle of arrival information. The TDM may project a pattern of light across the sensor array, with that pattern dependent on the angle of arrival of the incident light. Multiple photodetectors associated with one TDM may more accurately detect that pattern, because each photodetector of the multiple photodetectors is located at a different position in the image plane (the image plane comprising photodetectors that sense light). The relative intensity sensed by each photodetector may indicate an angle of arrival of the incident light.

Figure 19B:
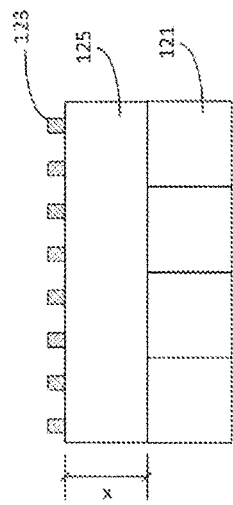
FIG. 19B is a side view of a photodetector array with a single TDM, according to some embodiments.
Figure 19A:
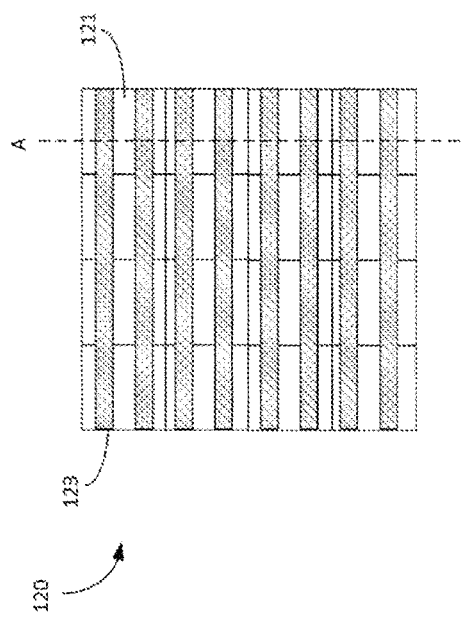
FIG. 19A is a top view of a photodetector array with a single TDM, according to some embodiments.

FIG. 19A is a top plan view example of a plurality of photodetectors (in the form of a photodetector array 120 which may be a subarray of pixel cells of an image sensor) associated with a single transmissive diffraction mask (TDM), according to some embodiments. FIG. 19B is a cross-section view of the same photodetector array as FIG. 19A, along a line A of FIG. 19A. The photodetector array 120, in the example shown, includes 16 separate photodetectors 121, which may be within pixel cells of an image sensor. The photodetector array 120 includes a TDM 123 disposed above the photodetectors. It should be understood that each group of pixel cells is illustrated with four pixels for the sake of clarity and simplicity (e.g. forming a four pixel by four pixel grid). Some embodiments may include more than four pixel cells. For example, 16 pixel cells, 64 pixel cells or any other number of pixels may be included in each group.

The TDM 123 is located a distance x from the photodetectors 121. In some embodiments, the TDM 123 is formed on a top surface of a dielectric layer 125 as illustrated in FIG. 19B. For example, the TDM 123 may be formed from ridges, as illustrated, or by valleys etched into the surface of the dielectric layer 125. In other embodiments, the TDM 123 may be formed within a dielectric layer. For example, portions of the dielectric layer may be modified to have a higher or lower index of refraction relative to the other portions of the dielectric layer, resulting in a holographic phase grating. Light incident on the photodetector array 120 from above is diffracted by the TDM, resulting in an angle of arrival of incident light to be converted into a position in an image plane a distance x from the TDM 123, where the photodetectors 121 are located. The intensity of the incident light measured at each photodetector 121 of the array of photodetectors may be used to determine the angle of arrival of the incident light.

Figure 20C:
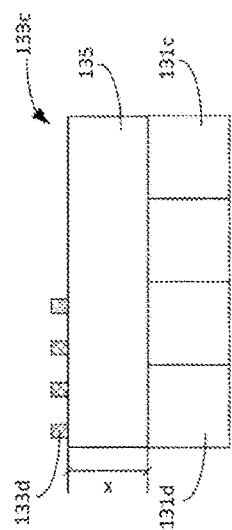
FIG. 20C is a side view of a photodetector array with multiple TDMs, according to some embodiments.
Figure 20B:
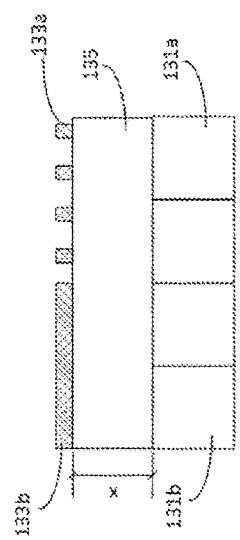
FIG. 20B is a side view of a photodetector array with multiple TDMs, according to some embodiments.
Figure 20A:
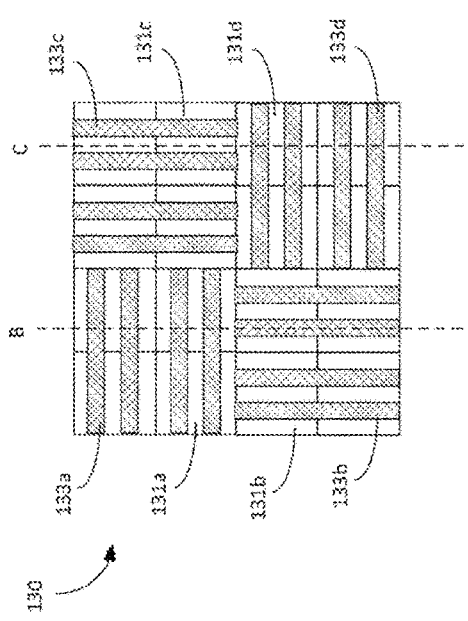
FIG. 20A is a top view of a photodetector array with multiple angle-of-arrival to-intensity converters in the form of TDMs, according to some embodiments.

FIG. 20A illustrates an example of a plurality of photodetectors (in the form of a photodetector array 130) associated with multiple TDMs, according to some embodiments. FIG. 20B is a cross-section view of the same photodetector array as FIG. 20A though a line B of FIG. 20A. FIG. 20C is a cross-section view of the same photodetector array as FIG. 20A through a line C of FIG. 20A. The photodetector array 130, in the example shown, includes 16 separate photodetectors, which may be within pixel cells of an image sensor. There are four groups 131*a*, 131*b*, 131*c*, 131*d* of four pixel cells illustrated. The photodetector array 130 includes four separate TDMs 133*a*, 133*b*, 133*c*, 133*d*, each TDM provided above an associated group of pixel cells. It should be understood that each group of pixel cells is illustrated with four pixel cells for the sake of clarity and simplicity. Some embodiments may include more than four pixel cells. For example, 16 pixel cells, 64 pixel cells or any other number of pixel cells may be included in each group.

Each TDM 133*a-d* is located a distance x from the photodetectors 131*a-d*. In some embodiments, the TDMs 133*a-d* are formed on a top surface of a dielectric layer 135 as illustrated in FIG. 20B. For example, the TDMs 123*a-d* may be formed from ridges, as illustrated, or by valleys etched into the surface of the dielectric layer 135. In other embodiments, the TDMs 133a-d may be formed within a dielectric layer. For example, portions of the dielectric layer may be modified to have a higher or lower index of refraction relative to the other portions of the dielectric layer, resulting in a holographic phase grating. Light incident on the photodetector array 130 from above is diffracted by the TDMs, resulting in an angle of arrival of incident light to be converted into a position in an image plane a distance x from the TDMs 133a-d, where the photodetectors 131a-d are located. The intensity of the incident light measured at each photodetector 131a-d of the array of photodetectors may be used to determine the angle of arrival of the incident light.

The TDMs 133a-d may be oriented in different directions from one another. For example, the TDM 133a is perpendicular to the TDM 133b. Thus the intensity of light detected using the photodetector group 131a may be used to determine the angle of arrival of incident light in a plane perpendicular to the TDM 133a and the intensity of light detected using the photodetector group 131b may be used to determine the angle of arrival of incident light in a plane perpendicular to the TDM 133b. Similarly, the intensity of light detected using the photodetector group 131c may be used to determine the angle of arrival of incident light in a plane perpendicular to the TDM 133c and the intensity of light detected using the photodetector group 131d may be used to determine the angle of arrival of incident light in a plane perpendicular to the TDM 133d.

Pixel cells configured to acquire depth information passively may be integrated in an image array with features as described herein to support operations useful in an X-reality system. In accordance with some embodiments, the pixel cells configured to acquire depth information may be implemented as part of an image sensor used to implement a camera with a global shutter. Such a configuration may provide a full frame output, for example. The full frame may include image information for different pixels indicating depth and intensity at the same time. With an image sensor of this configuration, a processor may acquire depth information for a full scene at once.

In other embodiments, the pixel cells of the image sensor that provide depth information may be configured to operate according to DVS techniques, as described above. In such a scenario, the event may indicate a change in depth of an object as indicated by a pixel cell. The event output by the image array may indicate the pixel cell for which a change of depth was detected. Alternatively or additionally, the event may include the value of the depth information for that pixel cell. With an image sensor of this configuration, a processor may acquire depth information updates at a very high rate, so as to provide high temporal resolution.

In yet other embodiments, an image sensor may be configured to operate in either a full frame or a DVS mode. In such an embodiment, a processor processing the image information from the image sensor may programmatically control the operating mode of the image sensor based on the functions being performed by the processor. For example, while performing functions involving tracking an object, the processor may configure the image sensor to output image information as DVS events. On the other hand, while processing to update a world reconstruction, the processor may configure the image sensor to output full frame depth information.

Having thus described several aspects of some embodiments, it is to be appreciated that various alterations, modifications, and improvements will readily occur to those skilled in the art.

As one example, embodiments are described in connection with an augmented (AR) environment. It should be appreciated that some or all of the techniques described herein may be applied in an MR environment or more generally in other XR environments.

Also, embodiments of an image array are described in which one patch is applied to an image array to control the selective outputting of image information about one movable object. It should be appreciated that there may be more than one movable object in a physical embodiment. Further, in some embodiments, it may be desirable to selectively obtain frequent updates of image information in regions other than where a movable object is located. For example, a patch may be set to selectively obtain image information about a region of the physical world where a virtual object is to be rendered. Accordingly, some image sensors may be able to selectively provide information for two or more patches, with or without circuitry to track the trajectory of those patches.

As yet a further example, an image array is described as outputting information relating to the magnitude of incident light. Magnitude may be a representation of power across a spectrum of light frequencies. That spectrum may be relatively broad capturing energy at frequencies corresponding to any color of visible light, such as in a black and white camera. Alternatively, the spectrum may be narrow, corresponding to a single color of visible light. Filters to limit light incident on an image array to light of a particular color may be used for this purpose. Where pixels are limited to receiving light of specific colors, different pixels may be limited to different colors. In such embodiments, outputs of pixels sensitive to the same color may be processed together.

A process for setting a patch in an image array and then updating the patch for an object of interest was described. This process may be performed, for example, for each movable object as it enters a field of view of an image sensor. The patches may be cleared when the object of interest leaves the field of view, such that the patches are no longer tracked or such that no image information is output for the patch. It should be appreciated that from time to time a patch may be updated, such as by determining the location of the object associated with the patch and setting the position of the patch to correspond to that location. A similar adjustment can be made to a computed trajectory of a patch. The motion vector for an object and/or motion vector of the image sensor may be computed from other sensor information and used to reset the values programmed into the image sensor, or other component, for patch tracking.

For example, locations, motions and other characteristics of objects may be determined by analyzing the output of a wide angle video camera or a pair of video camera with stereoscopic information. Data from these other sensors may be used to update the world model. In connection with an update, the patch position and/or trajectory information may be updated. Such updates may occur at a lower rate than the position of the patch is updated by a patch tracking engine. The patch tracking engine, for example, may compute a new patch position at a rate between about 1 and 30 times per second. Updates to the patch position based on other information may occur at a slower rate, such as once per second up to about once per 30 second interval.

As yet a further example of a variation, FIG. 2 shows a system with a head mounted display separate from a remote processing module. An image sensor as described herein may lead to a compact design of the system. Such a sensor generates less data, which in turn leads to lower processing requirements and less power consumption. Less need for processing and power, enables size reduction such as by reducing the size of batteries. Accordingly, in some embodiments, the entire augmented reality system may be integrated in a head mounted display without a remote processing module. The head mounted display may be configured as a pair of goggles or, as shown in FIG. 2, may resemble in size and shape a pair of glasses.

Further, embodiments are described in which an image sensor responds to visible light. It should be appreciated that the techniques described herein are not limited to operation with visible light. They may alternatively or additionally be response to IR light or "light" in other parts of the spectrum, such as UV. Moreover, the image sensor as described herein is response to naturally occurring light. Alternatively or additionally, the sensor may be used in a system with a source of illumination. In some embodiments, the sensitivity of the image sensor may be tuned to the portion of the spectrum in which the source of illumination emits light.

As another example, it is described that a selected region of an image array for which changes should be output from an image sensor is specified by specifying a "patch" on which image analysis is to be performed. It should be appreciated, however, that the patch and the selected region may be of different sizes. The selected region, for example, may be larger than the patch to account for motion of objects in an image being tracked that deviates from the predicted trajectory and/or to enable processing around the edges of the patch.

Such alterations, modifications, and improvements are intended to be part of this disclosure, and are intended to be within the spirit and scope of the disclosure. For example, in some embodiments, the color filter 102 of a pixel of an image sensor may not be a separate component, but is instead incorporated into a one of the other components of the pixel subarray 100. For example, in embodiments that include a single pixel with both an angle-of arrival-to-position intensity converter and a color filter, the angle-of-arrival to-intensity converter may be a transmissive optical component that is formed from a material that filters particular wavelengths.

In another example, an image sensor comprising a plurality of pixel cells is provided, wherein at least one pixel cell comprises a light-sensitive component; an intensity readout circuit, operatively coupled to the light-sensitive component, configured to sample an intensity of a light incident sensed by the light-sensitive component; an event readout circuit, operatively coupled to the light-sensitive component, configured to generate an output signal when the intensity of the light incident changes by at least a predetermined amount; and a depth readout circuit operatively coupled to the light-sensitive component, the depth readout circuit configured to indicate an angle of the light incident.

In some embodiments, the event readout circuit may be operatively coupled to the depth readout circuit, and the depth readout circuit may compute the angle of the light incident when the event readout circuit generates the output signal.

In some embodiments, the intensity readout circuit may be configured to sample the intensity of the light incident periodically at a first rate. In some such embodiments, the event readout circuit may be configured to generate the output signal at a second rate, the second rate being at least ten times faster than the first rate.

Further, though advantages of the present disclosure are indicated, it should be appreciated that not every embodiment of the disclosure will include every described advantage. Some embodiments may not implement any features described as advantageous herein. Accordingly, the foregoing description and drawings are by way of example only.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. In some embodiments, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format. In the embodiment illustrated, the input/output devices are illustrated as physically separate from the computing device. In some embodiments, however, the input and/or output devices may be physically integrated into the same unit as the processor or other elements of the computing device. For example, a keyboard might be implemented as a soft keyboard on a touch screen. In some embodiments, the input/output devices may be entirely disconnected from the computing device, and functionally integrated through a wireless connection.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the disclosure may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the disclosure discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a computer-readable medium that can be considered to be a manufacture (i.e., article of manufacture) or a machine. In some embodiments, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the disclosure may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. An image sensor comprising an image array, an input configured to receive signals specifying a selected region of the imaging array, at least one output at which signals representative of at least the selected region of the imaging array are presented, and a second output at which signals representative of changes in a detected image in the selected region of the imaging array are presented, the image sensor comprising:
    a plurality of pixel cells comprising the imaging array, each pixel cell of the plurality of pixel cells comprising a light-sensitive component;
    at least one intensity readout circuit operatively coupled to the light-sensitive components of the plurality of pixel cells and configured to provide signals indicating sensed light intensity at at least a portion of the light-sensitive components of the plurality of pixel cells at an output of the at least one output of the image sensor;
    at least one event detection circuit operatively coupled to the light-sensitive components of the plurality of pixel cells and configured to provide signals indicating a change in sensed light at at least a portion of the light-sensitive components of the plurality of pixel cells; and
    an enable circuit, operatively coupled to the input specifying the selected region of the imaging array and operatively coupled to the at least one event detection circuit, to control a selected portion of the pixel cells for which a signal indicating a change in sensed light is coupled to an output of the at least one output of the image sensor.

2. The image sensor of claim 1, wherein:
    the imaging array has a resolution higher than 1 megapixel.

3. The image sensor of claim 1, wherein:
    the selected region of the imaging array constitutes no more than 20% of the imaging array.

4. The image sensor of claim 1, wherein:
the at least one intensity readout circuit is configured to operate in a rolling shutter mode.

5. The image sensor of claim 4, in combination with:
a support member, wherein the image sensor is a first image sensor mounted to the frame;
a second image sensor mounted to the support member; and
at least one processor, wherein the processor is configured to process image information from the first image sensor when operating in the rolling shutter mode and the second image sensor to produce stereoscopic image information.

6. The image sensor of claim 1, wherein:
the at least one intensity readout circuit is configured to operate in a global shutter mode.

7. The image sensor of claim 6, in combination with:
at least one transmissive diffraction mask in a light path to the image sensor; and
at least one processor, wherein the processor is configured to process image information from the image sensor when operating in the global shutter mode to extract passive depth information.

8. The image sensor of claim 6, wherein:
the enable circuit is operatively coupled to the at least one intensity readout circuit to control a selected portion of the pixel cells for which a signal indicating the sensed light intensity is provided to an output of the at least one output.

9. The image sensor of claim 1, wherein:
the at least one intensity readout circuit outputs the signals indicating the sensed light intensity at the at least a portion of the light-sensitive components of the plurality of pixel cells at fixed time intervals.

10. The image sensor of claim 1, wherein:
the at least one intensity readout circuit outputs the signals indicating the sensed light intensity at the at least a portion of the light-sensitive components of the plurality of pixel cells at in response to a control input to the image sensor.

11. The image sensor of claim 1, wherein:
the at least one intensity readout circuit outputs the signals indicating the sensed light intensity based on the signals indicating the change in sensed light from the at least one event readout circuit.

12. A device for use in a cross reality system, comprising:
a support member;
the image sensor of claim 1 mechanically coupled to the support member, wherein the image sensor is a first image sensor;
a second image sensor mechanically coupled to the support member and spaced apart from the first image sensor, the second image sensor comprising a second plurality of pixel cells generating image information for respective regions in a field of view of the second sensor;
a processor, operatively coupled to the first and second sensors and configured to generate depth information about an object based on the signals indicating the sensed light intensity based on correspondence between the signals indicating the change in sensed light from the at least one event readout circuit of the first image sensor and the image information from the second image sensor.

13. A method of operating a cross reality system comprising a sensor worn by a user and a processor configured to process image information, the sensor comprising a plurality of pixel cells generating image frames and event information for respective regions in a field of view of the sensor, the method comprising:
identifying an object in the vicinity of the user;
identifying a patch based at least in part on a portion of the identified object;
providing at a first data rate, from the sensor to the processor, the image frames from the plurality of pixel cells for the respective regions in the field of view of the sensor; and
selectively providing at a second data rate, from the sensor to the processor, the event information from a portion of the plurality of pixel cells based at least in part on correspondence between the patch and portion of the plurality of pixel cells, the second data rate being higher than the first data rate.

14. The method of claim 13, wherein:
the portion of the plurality of pixel cells of the sensor is a first portion of the plurality of pixel cells, and
the method further comprises:
periodically estimating, at a third data rate, a trajectory for the patch based at least in part on the identified object; and
enabling a plurality of portions of the plurality of pixel cells of the sensor at different times based at least in part on the estimated trajectory of the patch, wherein the plurality of portions of the plurality of pixel cells comprise the first portion of the plurality of pixel cells.

15. The method of claim 13, wherein:
the sensor is a first sensor,
the computing system comprises a second senor comprising a second plurality of pixel cells generating image frames for respective regions in a field of view of the second sensor, and
the method comprises:
providing, from the second sensor to the processor, the image frames from the second plurality of pixel cells of the second sensor for the respective regions in the field of view of the second sensor; and
computing depth information of an object within the field of views of both the first and second sensors based at least in part on correspondence between the image frames from the first sensor and the image frames from the second sensor.

16. An image sensor comprising a plurality of pixel cells, at least one pixel cell comprising:
a light-sensitive component;
an intensity readout circuit operatively coupled to the light-sensitive component, the intensity readout circuit configured to sample an intensity of a light incident sensed by the light-sensitive component;
an event readout circuit operatively coupled to the light-sensitive component, the event readout circuit configured to generate an output signal when the intensity of the light incident changes by at least a predetermined amount; and
a depth readout circuit operatively coupled to the light-sensitive component, the depth readout circuit configured to indicate an angle of the light incident.

17. The at least one pixel cell of claim 16, wherein:
the intensity readout circuit is operatively coupled to the event readout circuit.

18. The at least one pixel cell of claim 17, wherein:
the intensity readout circuit samples the intensity of the light incident when the event readout circuit generates the output signal.

19. The at least one pixel cell of claim 17, wherein:
the event readout circuit is enabled or disabled based, at least in part, on an output of the intensity readout circuit.

20. The at least one pixel cell of claim 16, wherein:
the intensity readout circuit is operatively coupled to the depth readout circuit, and
the depth readout circuit computes the angle of the light incident based, at least in part, on an output of the intensity readout circuit.

* * * * *